(12) United States Patent
Konno

(10) Patent No.: US 7,079,325 B2
(45) Date of Patent: Jul. 18, 2006

(54) TAKING LENS APPARATUS

(75) Inventor: Kenji Konno, Sakai (JP)

(73) Assignee: Minolta Co., Ltd., Osaka (JP)

( * ) Notice: Subject to any disclaimer, the term of this patent is extended or adjusted under 35 U.S.C. 154(b) by 232 days.

(21) Appl. No.: 10/629,441

(22) Filed: Jul. 29, 2003

(65) Prior Publication Data

US 2004/0246362 A1    Dec. 9, 2004

(30) Foreign Application Priority Data

May 12, 2003    (JP) .............................. 2003-132630

(51) Int. Cl.
*G02B 15/14* (2006.01)
(52) U.S. Cl. ...................... 359/682; 359/689; 359/716; 359/740; 359/726; 359/737; 359/781; 359/784; 396/72; 396/79; 396/351
(58) Field of Classification Search ........ 359/680–683, 359/686, 689, 716, 740, 749, 781, 783, 784, 359/726, 737; 396/72, 79, 351; 348/240.99, 348/240.3, 335, 369
See application file for complete search history.

(56) References Cited

U.S. PATENT DOCUMENTS

| | | | | |
|---|---|---|---|---|
| 4,906,078 A | * | 3/1990 | Inabata et al. ............... | 359/680 |
| 5,157,550 A | * | 10/1992 | Tsuchida et al. ............ | 359/686 |
| 5,448,319 A | | 9/1995 | Uzawa ......................... | 354/81 |
| 6,104,432 A | | 8/2000 | Nakamura et al. .......... | 348/360 |

(Continued)

FOREIGN PATENT DOCUMENTS

EP    0 906 587 B1    9/2002

(Continued)

OTHER PUBLICATIONS

Japanese "Notification of Reasons for Refusal", dated May 31, 2005, for counterpart Japanese Patent Application No. 2003-132630, along with an English-translation thereof.

*Primary Examiner*—Evelyn A. Lester
(74) *Attorney, Agent, or Firm*—Sidley Austin LLP

(57) ABSTRACT

A taking lens apparatus has a zoom lens system that is composed of a plurality of lens units and that achieves zooming by varying the distances between the lens units and an image sensor that converts the optical image formed by the zoom lens system into an electrical signal. The zoom lens system has a first lens unit that is disposed at the object-side end of the zoom lens system, that has a negative optical power as a whole, that includes a reflective member for bending the optical axis of the zoom lens system as a whole at substantially 90°, and that remains stationary relative to the image sensor during the zooming of the zoom lens system, a second lens unit that is disposed on the image-sensor side of the first lens unit with a variable aerial distance secured in between, that has a positive optical power as a whole, and that moves toward the object side during the zooming of the zoom lens system from the wide-angle end to the telephoto end, and a third lens unit that is disposed on the image-sensor side of the second lens unit with a variable aerial distance secured in between, that has a positive optical power as a whole, and that moves toward the object side during the zooming of the zoom lens system.

50 Claims, 20 Drawing Sheets

U.S. PATENT DOCUMENTS

| | | | |
|---|---|---|---|
| 6,362,924 B1 * | 3/2002 | Ohno | 359/689 |
| 6,498,687 B1 | 12/2002 | Sekita et al. | 359/680 |
| 6,538,824 B1 * | 3/2003 | Mihara et al. | 359/684 |
| 6,545,819 B1 * | 4/2003 | Nanba et al. | 359/689 |
| 6,643,072 B1 * | 11/2003 | Mihara | 359/686 |
| 6,721,106 B1 * | 4/2004 | Yamamoto et al. | 359/689 |
| 6,728,482 B1 * | 4/2004 | Hagimori et al. | 396/72 |
| 6,747,813 B1 * | 6/2004 | Wakai et al. | 359/726 |
| 6,771,432 B1 * | 8/2004 | Mihara | 359/687 |
| 6,813,091 B1 * | 11/2004 | Nanba | 359/689 |
| 6,850,373 B1 * | 2/2005 | Mihara et al. | 359/676 |
| 6,853,807 B1 * | 2/2005 | Hagimori et al. | 396/72 |
| 2002/0136150 A1 | 9/2002 | Mihara et al. | 369/125 |
| 2003/0179464 A1 * | 9/2003 | Amanai | 359/685 |
| 2004/0012704 A1 * | 1/2004 | Hagimori et al. | 348/335 |
| 2004/0021783 A1 * | 2/2004 | Mihara | 348/240.99 |
| 2004/0105020 A1 * | 6/2004 | Iwasawa | 248/240.3 |

FOREIGN PATENT DOCUMENTS

| | | |
|---|---|---|
| JP | 05-336435 A | 12/1993 |
| JP | 08-248318 A | 9/1996 |
| JP | 11-196303 A | 7/1999 |
| JP | 11-258678 A | 9/1999 |
| JP | 2000-131610 A | 5/2000 |
| JP | 2000-137164 A | 5/2000 |
| JP | 2003-98435 A | 4/2003 |

* cited by examiner

SPHERICAL
ABERRATION(mm)

ASTIGMATISM(mm)

DISTORTION%

SPHERICAL
ABERRATION(mm)

ASTIGMATISM(mm)

DISTORTION%

SPHERICAL
ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

SPHERICAL ABERRATION(mm)

ASTIGMATISM(mm)

DISTORTION%

TAKING LENS APPARATUS

This application is based on Japanese Patent Application No. 2003-132630 filed on May 12, 2003, the contents of which are hereby incorporated by reference.

BACKGROUND OF THE INVENTION

1. Field of the Invention

The present invention relates to a taking lens apparatus. More specifically, the present invention relates to a taking lens apparatus (a main component of a digital still camera, digital video camera, or camera incorporated in or externally fitted to a personal computer, mobile computer, cellular phone, personal digital assistant (PDA), or the like) that optically takes in an image of a subject through an optical system and that then outputs it in the form of an electrical signal by means of an image sensor, and in particular to a taking lens apparatus provided with a compact zoom lens system. The present invention also relates to a slim camera provided with such a taking lens apparatus.

2. Description of the Prior Art

In recent years, as personal computers and the like become increasingly wide-spread, digital still cameras and digital video cameras (hereinafter collectively referred to as digital cameras), which permit easy capturing of images into digital equipment, have been becoming increasingly popular with individual users. Digital cameras are expected to continue becoming more and more popular into the future as an image data input device. The image quality of a digital camera generally depends on the number of pixels provided on a solid-state image sensor, such as a CCD (charge-coupled device). Nowadays, digital cameras for general consumers boast of high resolution over one mega pixels, and are closing in on cameras using silver-halide film in image quality. Accordingly, to cope with high resolution of modern image sensors, high optical performance is sought in taking lens systems.

Moreover, in digital cameras for general consumers, while zooming, in particular optical zooming with minimal image degradation, is desired, slimness is also required for better portability. Accordingly, to cope with increasingly high image quality and increasing slimness in digital cameras, various types of zoom lens systems have conventionally been proposed, for example in the following publications:

Document 1: U.S. Pat. No. 6,498,687

Document 2: Japanese Patent Application Laid-Open No. 2000-137164

Document 3: Japanese Patent Application Laid-Open No. H8-248318

Document 4: U.S. Pat. No. 6,104,432

Document 5: United States Patent Application Published No. 2002/0136150 A1

Document 6: Japanese Patent Application Laid-Open No. H11-258678

In conventionally proposed zoom lens systems for digital cameras, the most common way to make a digital camera slim is to adopt a so-called collapsible lens barrel. In a zoom lens system adopting a collapsible lens barrel, when the camera is not used, the zoom lens system collapses so that its lens elements are held with minimum distances between them, and, when the camera is used, the zoom lens system moves out so that its lens elements are held in a duly arranged state. The zoom lens system disclosed in Document 1 attempts to reduce its thickness in its collapsed state by reducing the number of constituent lens elements while maintaining satisfactory optical performance. However, with a construction adopting a collapsible lens barrel, it is not possible to reduce the thickness of the zoom lens system to less than the total of the thickness of the lens elements themselves, that of the image sensor, and that of the optical filter and other components required by the image sensor. This makes it impossible to make the digital camera satisfactorily slim.

Another way to make a digital camera slim is to ingeniously arranging a zoom lens system inside the camera. In common digital cameras, a zoom lens system is arranged with the largest surface of its housing facing the subject. Arranging the zoom lens system in this way, however, results in the length of the zoom lens system greatly affecting the thickness of the digital camera. This can be overcome by arranging a zoom lens system, like the one disclosed in Document 2, with its optical axis parallel to the largest surface of its housing. This prevents the thickness of the digital camera from being affected by the length of the zoom lens system, and thus helps make the digital camera slim. This construction, however, makes the camera elongate, and thus makes the camera extremely difficult to use. Usability may be improved by rotatably fitting the lens barrel so that the lens barrel is rotated when the camera is used. This, however, additionally requires a mechanism for rotating the lens barrel, and thus eventually increases the thickness of the digital camera. Moreover, extra operations are required to rotate the lens barrel at the start and end of photographing. This is troublesome and is therefore undesirable.

As described above, making photographing possible with the largest surface of the housing of a zoom lens system facing the subject is one requirement for realizing a slim and easy-to-operate digital camera. Examples of optical constructions that meet this requirement are the zoom lens systems disclosed in Documents 3 to 6. The zoom lens systems disclosed in Documents 3 to 6 are all so constructed as to make the largest surface of their housing face the subject by bending the optical path with a prism or mirror inserted between lens elements. However, none of these zoom lens systems is so constructed as to make a digital camera satisfactorily slim.

For example, the zoom lens system disclosed in Document 3 has a zoom construction where the first lens unit has a positive optical power (a so-called positive-led zoom construction), and the zoom lens system disclosed in Document 4 has a zoom construction where the first lens unit is afocal. With these zoom constructions, it is difficult to achieve zooming with a small number of zoom components, and in fact they achieve zooming with as many as four zoom components. Using a large number of zoom components complicates the construction of the lens barrel, and thus enlarges the lens barrel as a whole including drive components. This makes it difficult to make a camera slim. The zoom lens system disclosed in Document 5 achieves zooming by deforming a mirror. The construction required to drive and control the mirror to be deformed makes it difficult to make a digital camera slim. The zoom lens system disclosed in Document 6 achieves zooming by moving a lens disposed on the object side of a mirror. This requires the lens to be moved perpendicularly to the largest surface of the housing of the zoom lens system, and thus makes it difficult to make a digital camera slim.

SUMMARY OF THE INVENTION

An object of the present invention is to provide a slim taking lens apparatus provided with a compact, high-performance zoom lens system so as to offer high image quality.

To achieve the above object, according to one aspect of the present invention, a taking lens apparatus is provided with: a zoom lens system that is composed of a plurality of lens units and that achieves zooming by varying the distances between the lens units; and an image sensor that converts the optical image formed by the zoom lens system into an electrical signal. Here, the zoom lens system is provided with: a first lens unit that is disposed at the object-side end of the zoom lens system, that has a negative optical power as a whole, and that remains stationary relative to the image sensor during the zooming of the zoom lens system; a second lens unit that is disposed on the image-sensor side of the first lens unit with a variable aerial distance secured in between, that has a positive optical power as a whole, and that moves toward the object side during the zooming of the zoom lens system from the wide-angle end to the telephoto end; and a third lens unit that is disposed on the image-sensor side of the second lens unit with a variable aerial distance secured in between, that has a positive optical power as a whole, and that moves toward the image side during initial zooming from the wide-angle end to the telelphoto end.

To achieve the above object, according to another aspect of the present invention, a taking lens apparatus is provided with: a zoom lens system that is composed of a plurality of lens units and that achieves zooming by varying the distances between the lens units; and an image sensor that converts the optical image formed by the zoom lens system into an electrical signal. Here, the zoom lens system is provided with: a first lens unit that is disposed at the object-side end of the zoom lens system, that has a negative optical power as a whole, that includes a reflective member for bending the optical axis of the zoom lens system as a whole at substantially 90°, and that remains stationary relative to the image sensor during the zooming of the zoom lens system; a second lens unit that is disposed on the image-sensor side of the first lens unit with a variable aerial distance secured in between, that has a positive optical power as a whole, and that moves toward the object side during the zooming of the zoom lens system from the wide-angle end to the telephoto end; and a third lens unit that is disposed on the image-sensor side of the second lens unit with a variable aerial distance secured in between, that has a positive optical power as a whole, and that moves toward the image side during initial zooming from the wide-angle end to the telelphoto end.

According to still another aspect of the present invention, a camera is provided with one of the taking lens apparatuses described above.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 20:
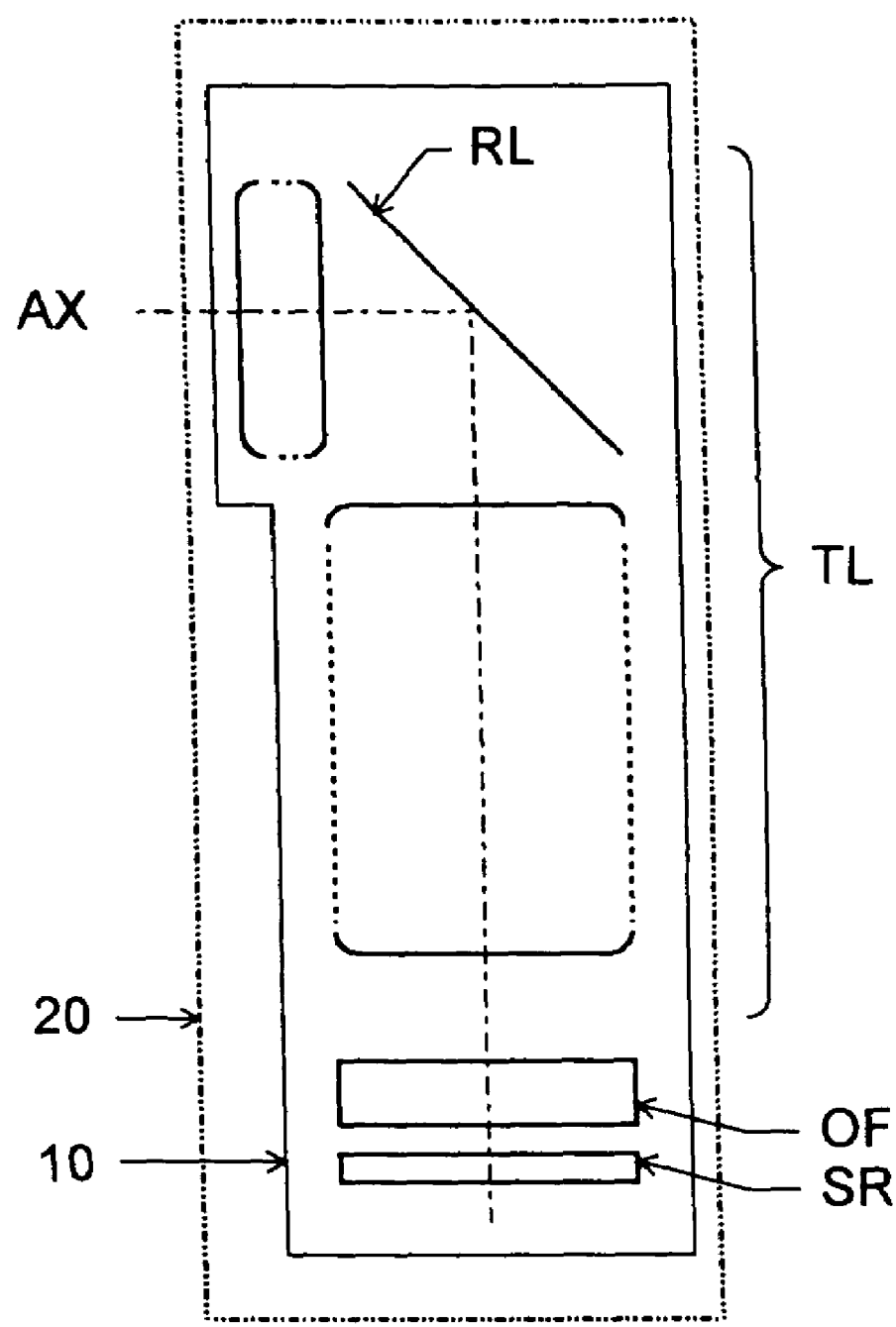
FIG. 20 is a diagram schematically showing an outline of the optical construction of a taking lens apparatus embodying the invention.

Hereinafter, taking lens apparatuses embodying the present invention will be described with reference to the drawings. A taking lens apparatus takes in an image of a subject optically and outputs it in the form of an electrical signal. A taking lens apparatus is used as a main component of a camera (for example, a digital camera, video camera, or camera incorporated in or externally fitted to a digital video unit, personal computer, mobile computer, cellular phone, personal digital assistant (PDA), peripheral device therefor (such as a mouse, scanner, printer, or other digital input/output device) or the like) that is used to photograph a still or moving picture of a subject. For example as shown in FIG. 20, a taking lens apparatus 10 is composed of, from the object (subject) side, a taking lens system TL for forming an optical image of an object, a parallel-surface plate OF acting as an optical filter (for example, an optical low-pass filter) or the like, and an image sensor SR for converting the optical image formed by the taking lens system TL into an electrical signal, and is incorporated in a camera 20. As necessary, the taking lens apparatus 10 may be designed to be freely detachable from or rotatable relative to the body of the camera 20.

As shown in FIG. 20, in the middle of the optical path of the taking lens system TL is disposed a reflective surface RL having a flat surface, and at least one lens element is disposed both in front of and behind the reflective surface RL. This reflective surface RL serves to bend the optical path so that the taking lens system TL is used as a bending optical system, and thus reflects a light beam so that the optical axis AX is bent at substantially 90° (i.e., at 90° or approximately 90°). The reflective surface RL is realized with a reflective member such as a kind of prism (such as a rectangular prism) or a kind of mirror (such as a flat mirror).

In all the embodiments of the invention described later, a zoom lens system composed of a plurality of lens units is used as the taking lens system TL, and zooming is achieved by moving a plurality of lens units along the optical axis AX in such a way as to vary the distances between them. Used as the image sensor SR is, for example, a solid-state image sensor such as a CCD (charge-coupled device) or a CMOS (complementary metal-oxide semiconductor) sensor composed of a plurality of pixels. The optical image formed by the zoom lens system is converted into an electrical signal by the image sensor SR.

The optical image to be formed by the zoom lens system passes through the optical low-pass filter (realized with the parallel-surface plate PL) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electrical signal. Used as the optical low-pass filter is a birefringence-type low-pass filter made of quartz or the like having an appropriately aligned crystal axis, a phase-type low-pass filter that achieves the required optical cut-off frequency characteristics by exploiting diffraction, or a low-pass filter of any other type. The signal produced by the image sensor SR is subjected to predetermined digital image processing, image compression processing, and the like as necessary, and is recorded in a memory (such as a semiconductor memory or an optical disk) as a digital video signal; in some cases, the signal is transferred to another device through a cable or after being converted into an infrared signal.

In the taking lens apparatus 10 shown in FIG. 20, the taking lens system TL performs reduction-projection from the subject located on the enlargement side (with a longer conjugate distance) to the image sensor SR located on the reduction side (with a shorter conjugate distance). It is, however, also possible to use instead of the image sensor SR a display device (for example, a liquid crystal display device) that displays a two-dimensional image, and use the taking lens system TL as a projection lens system. In this way, it is possible to realize an image projection apparatus that performs enlargement-projection from the image display surface located on the reduction side to a screen surface located on the enlargement side. That is, the zoom lens systems of all the embodiments described below can be suitably used not only as a taking lens system TL but also as a projection lens system.

FIGS. 1 to 5 are optical construction diagrams of the zoom lens systems of a first to a fifth embodiment of the invention, respectively, each showing the lens construction, optical path, and other features of the corresponding zoom lens system as observed at the wide-angle end W in an optical section along a straightened optical path. FIGS. 6 to 10 are optical construction diagrams of the zoom lens systems of the first to fifth embodiments, respectively, each showing the lens construction, optical path, and other features of the corresponding zoom lens system as observed at the wide-angle end W in an optical section along a bent optical path. In FIGS. 1 to 5, arrows m2 and m3 schematically indicate the movement of the second and third lens units GR2 and GR3, respectively, during zooming from the wide angle end W to the telephoto end T, and, in FIG. 5, an arrow mS indicates that the aperture stop ST remains stationary during zooming. In FIGS. 1 to 5, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, through only those axial distances which vary as zooming is performed, i.e., variable axial distances, are shown here.

In all the embodiments, the zoom lens system is built as a three-unit zoom lens system that is composed of, from the object side, a first lens unit GR1 having a negative optical power, a second lens unit GR2 having a positive optical power, and a third lens unit GR3 having a positive optical power (here, the optical power is a quantity defined as the reciprocal of the focal length) and that achieves zooming by moving, as movable lens units, the second and third lens units GR2 and GR3 in such a way as to vary the distances between the individual lens units. In the first to fifth embodiments (FIGS. 1 to 5), during zooming from the wide-angle end W to the telephoto end T, the second lens unit GR2 moves toward the object side. That is, during zooming from the wide-angle end W to the telephoto end T, the second lens unit GR2 moves monotonically from the image side to the object side and thereby varies its position relative to the image surface IM.

Figure 1:
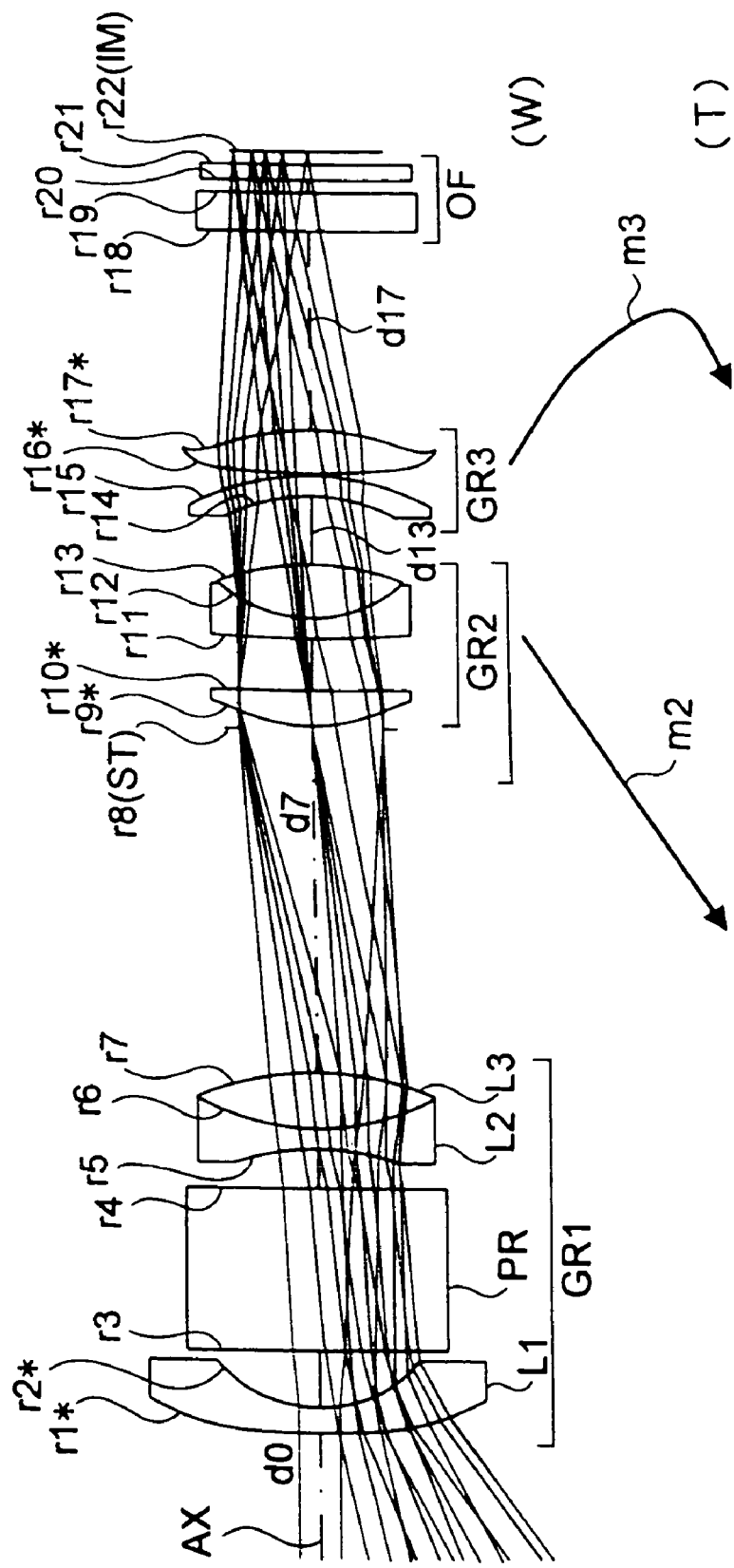
FIG. 1 is an optical construction diagram of a first embodiment (Example 1) of the invention, showing its optical path and lens construction along a straightened optical path.
Figure 2:
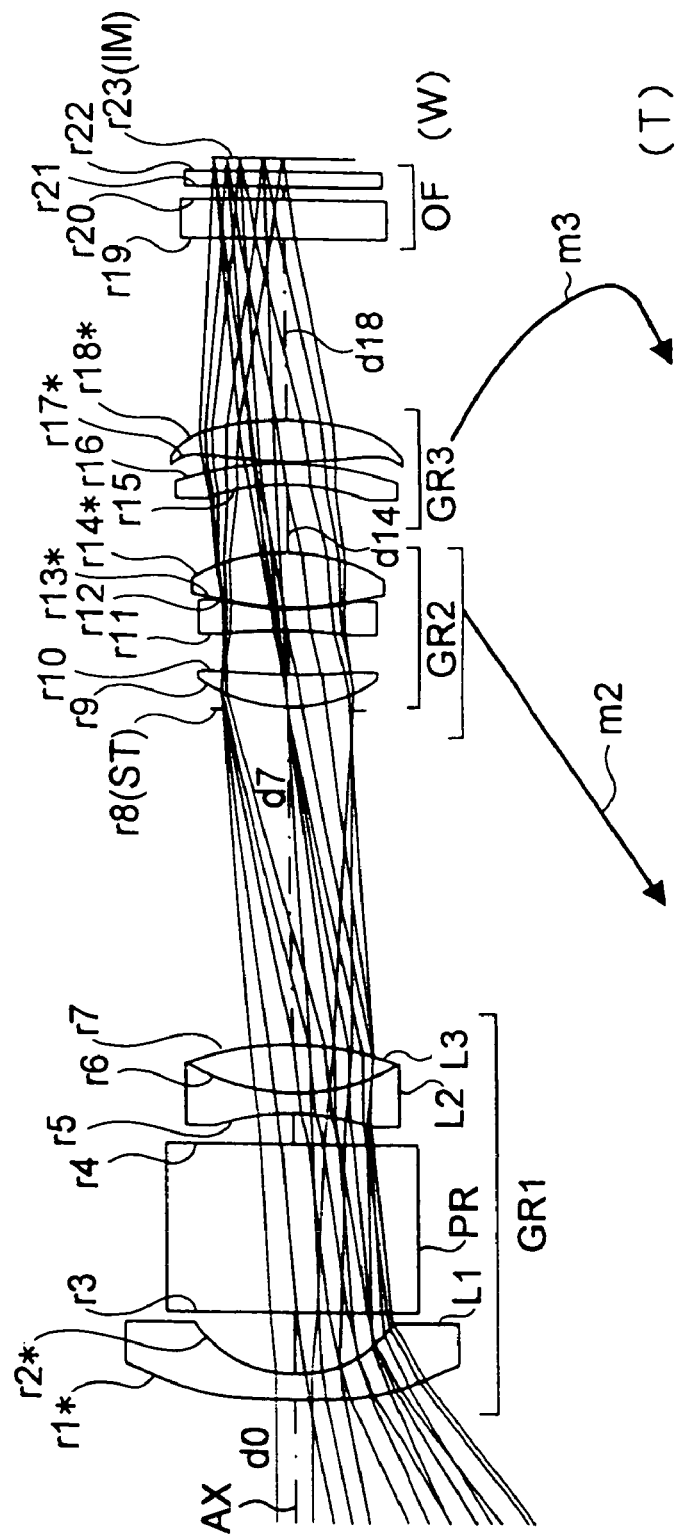
FIG. 2 is an optical construction diagram of a second embodiment (Example 2) of the invention, showing its optical path and lens construction along a straightened optical path.
Figure 3:
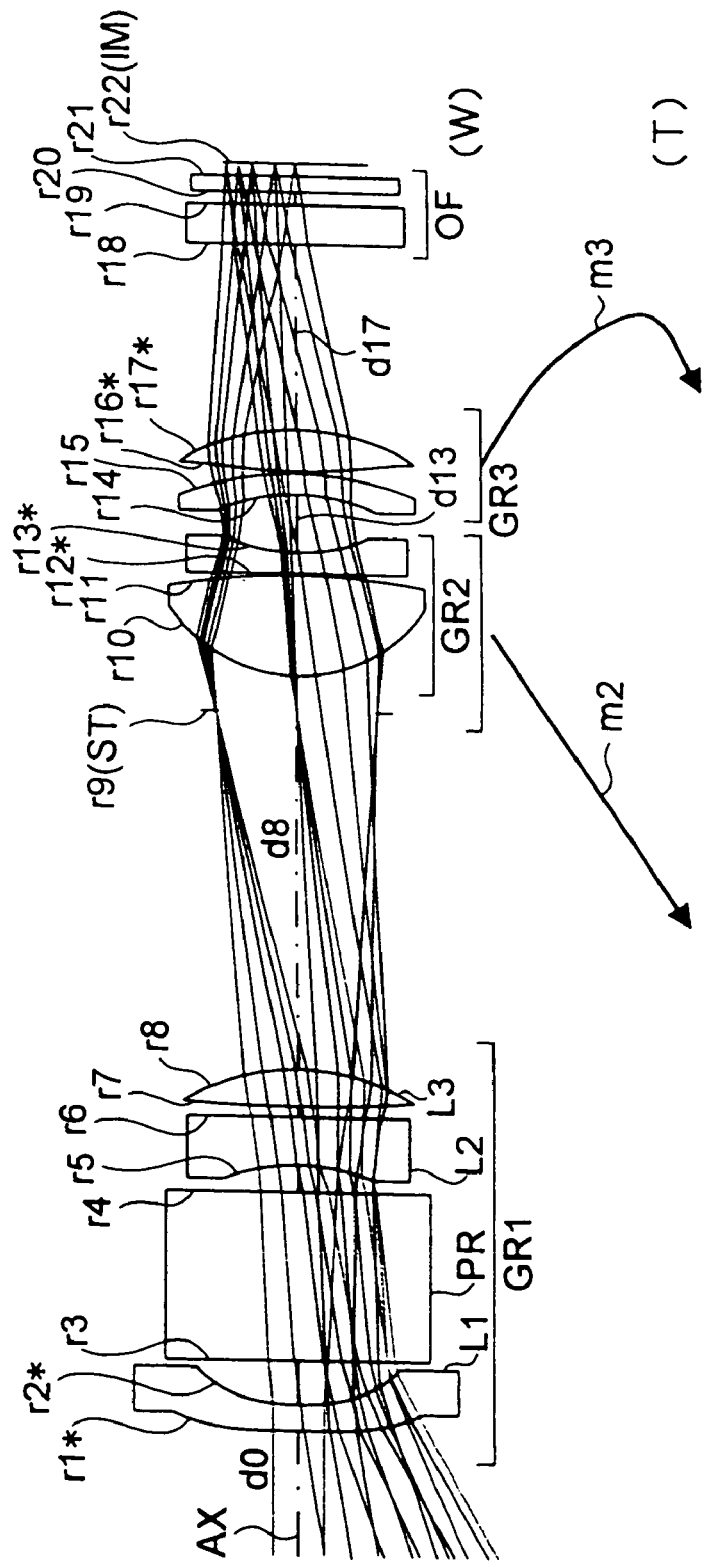
FIG. 3 is an optical construction diagram of a third embodiment (Example 3) of the invention, showing its optical path and lens construction along a straightened optical path.
Figure 4:
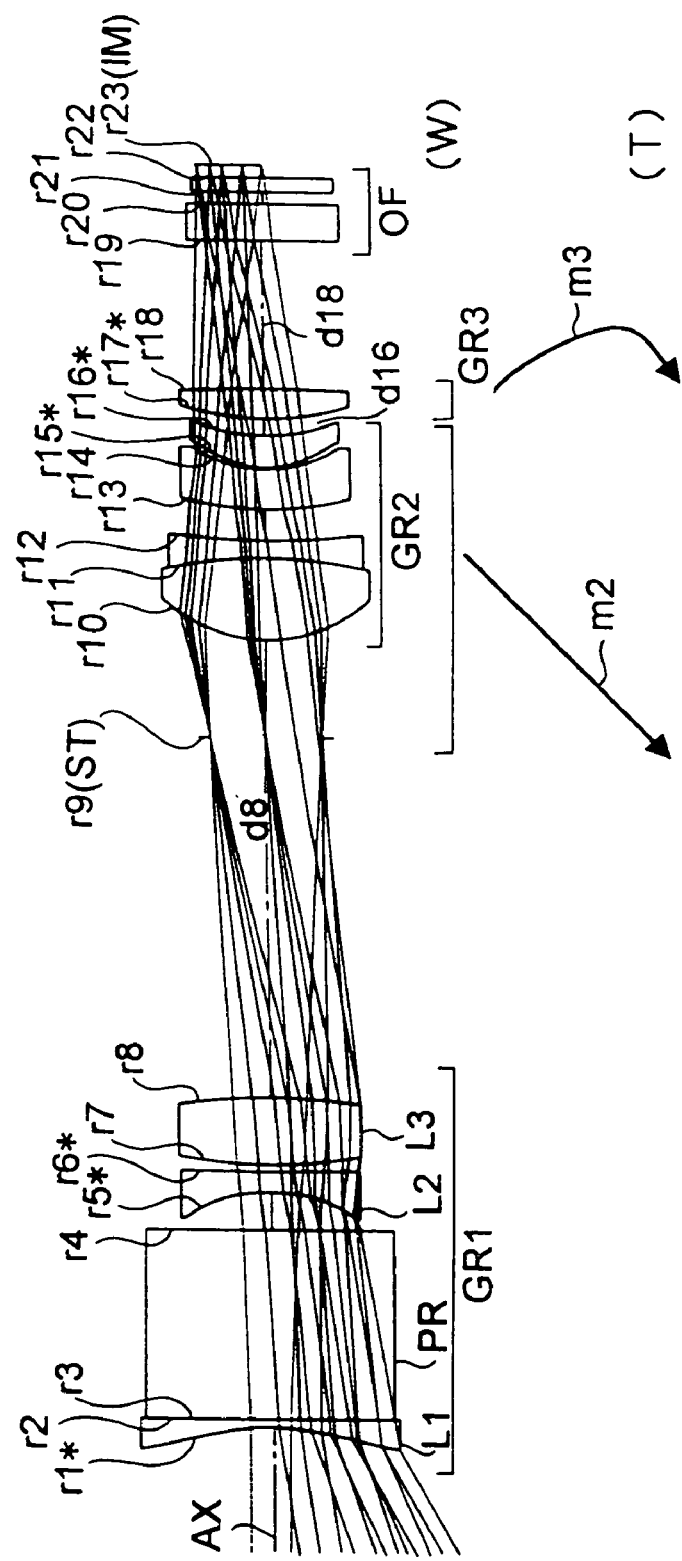
FIG. 4 is an optical construction diagram of a fourth embodiment (Example 4) of the invention, showing its optical path and lens construction along a straightened optical path.
Figure 5:
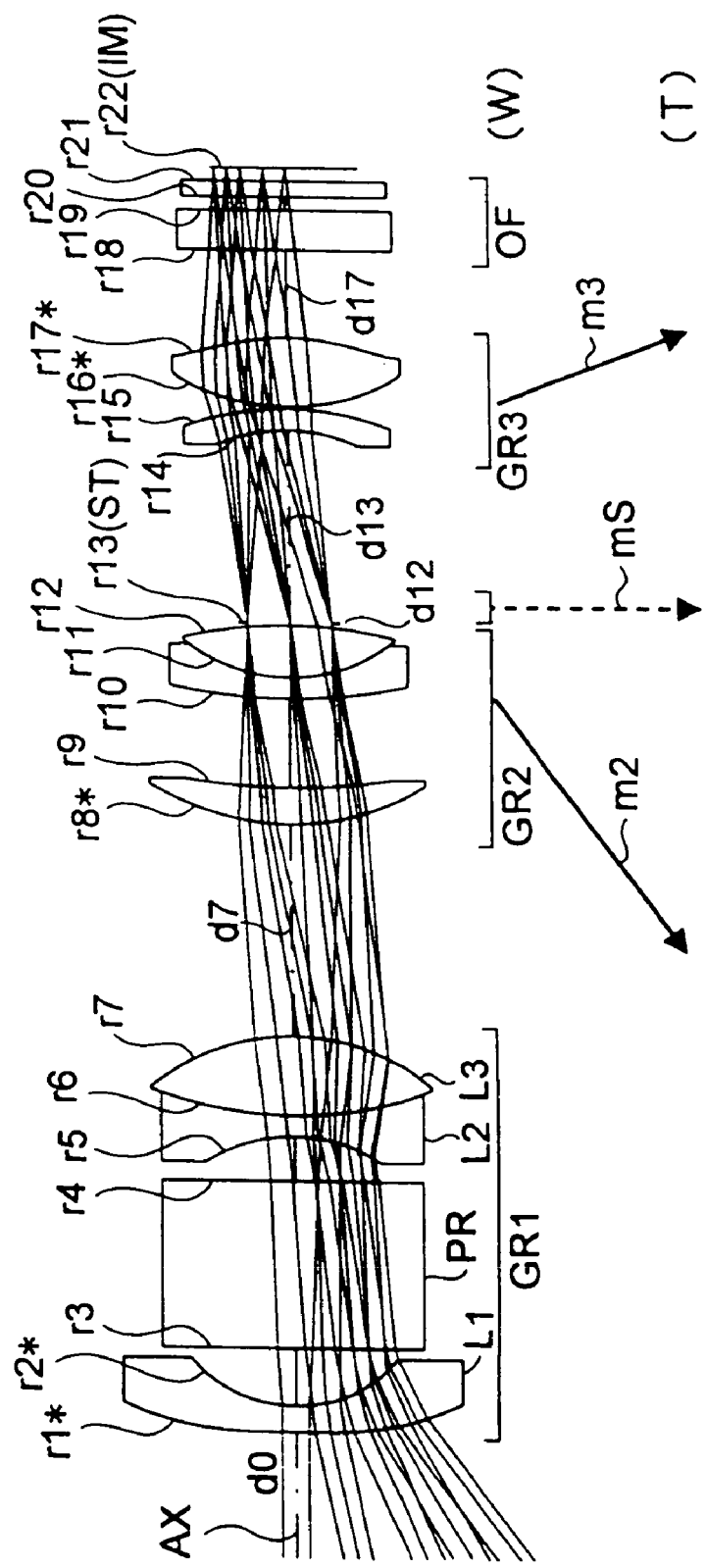
FIG. 5 is an optical construction diagram of a fifth embodiment (Example 5) of the invention, showing its optical path and lens construction along a straightened optical path.
Figure 6:
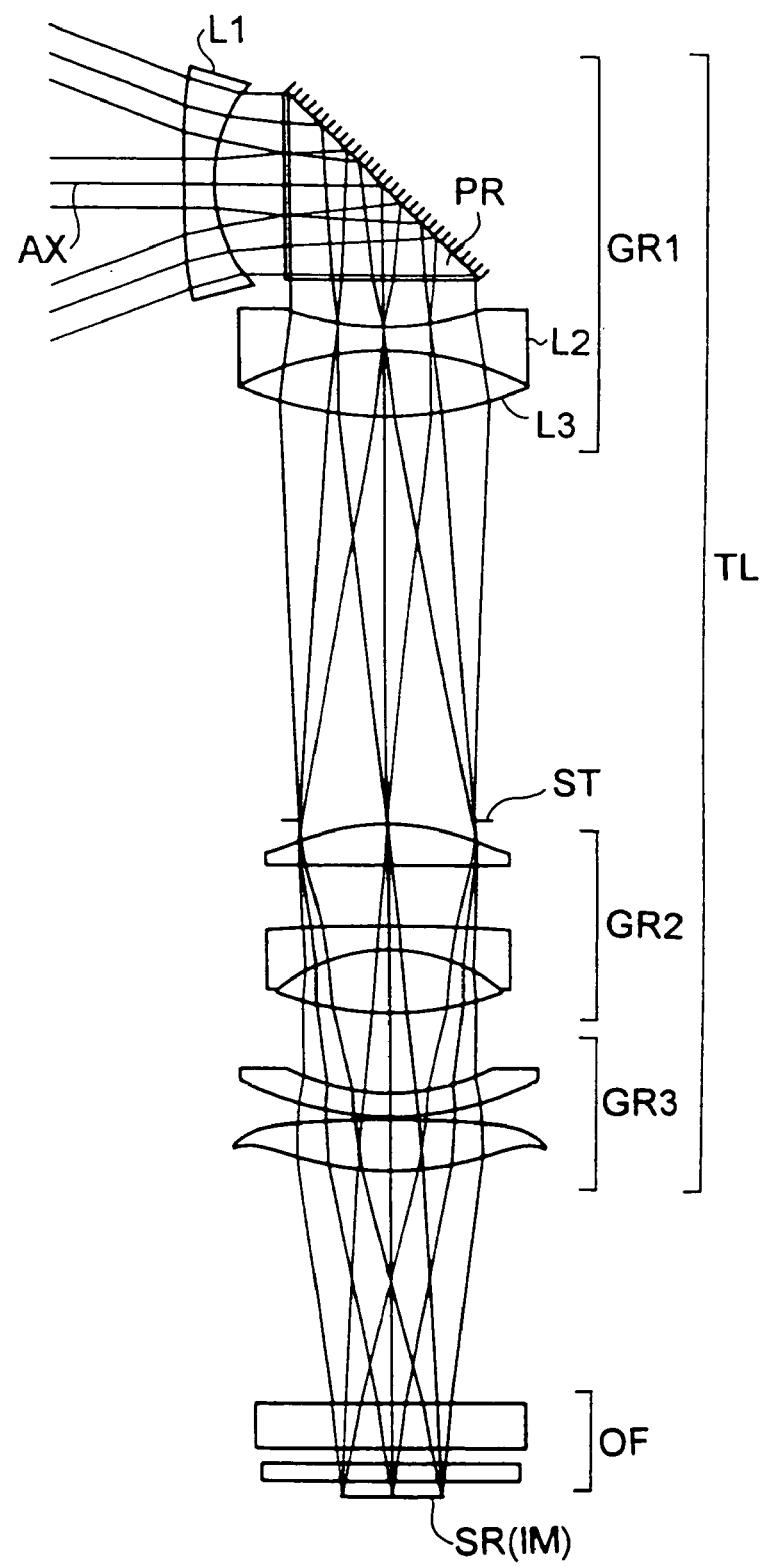
FIG. 6 is an optical construction diagram of the first embodiment (Example 1), showing its optical path and lens construction along a bent optical path.
Figure 7:
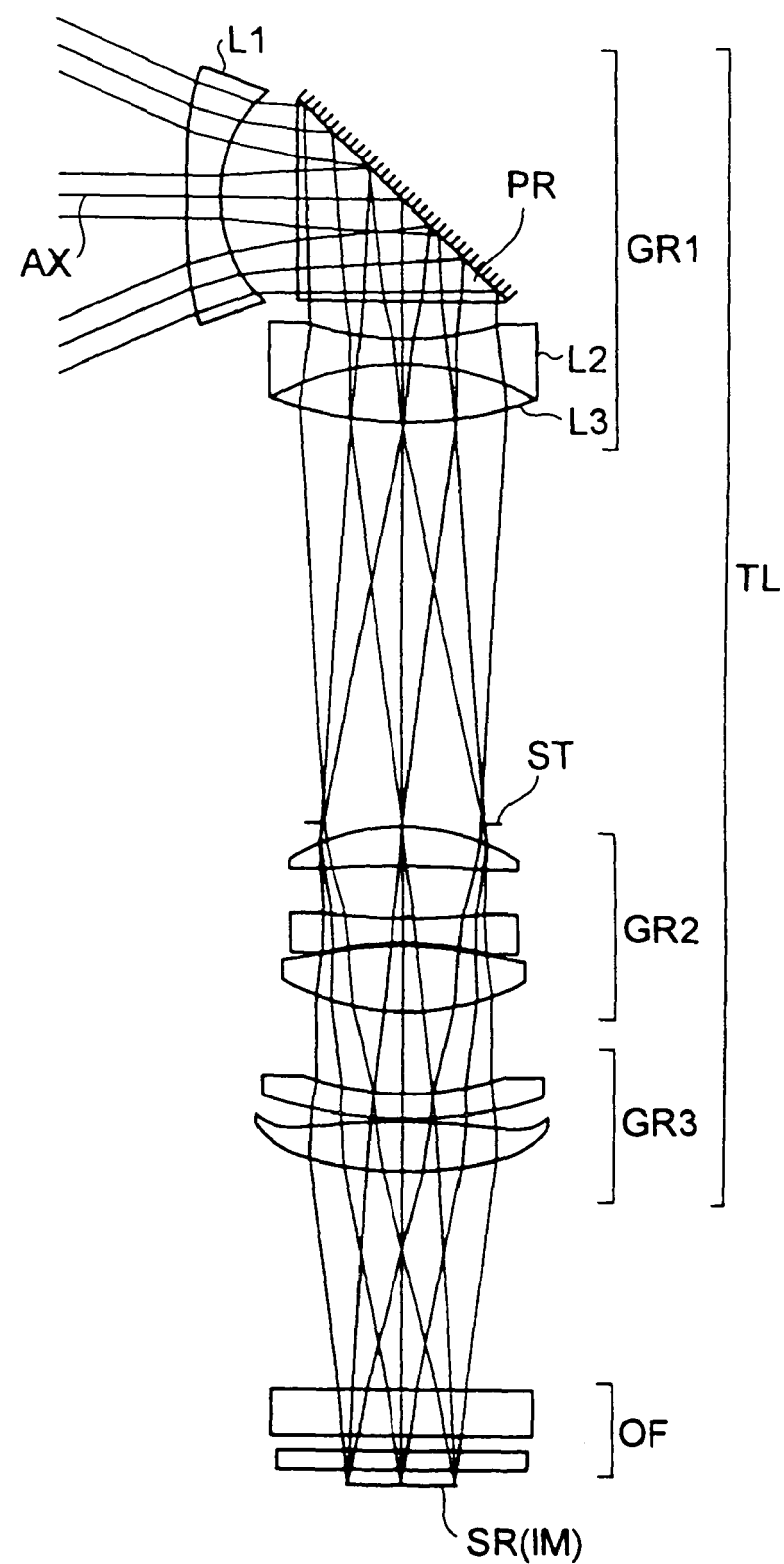
FIG. 7 is an optical construction diagram of the second embodiment (Example 2), showing its optical path and lens construction along a bent optical path.
Figure 8:
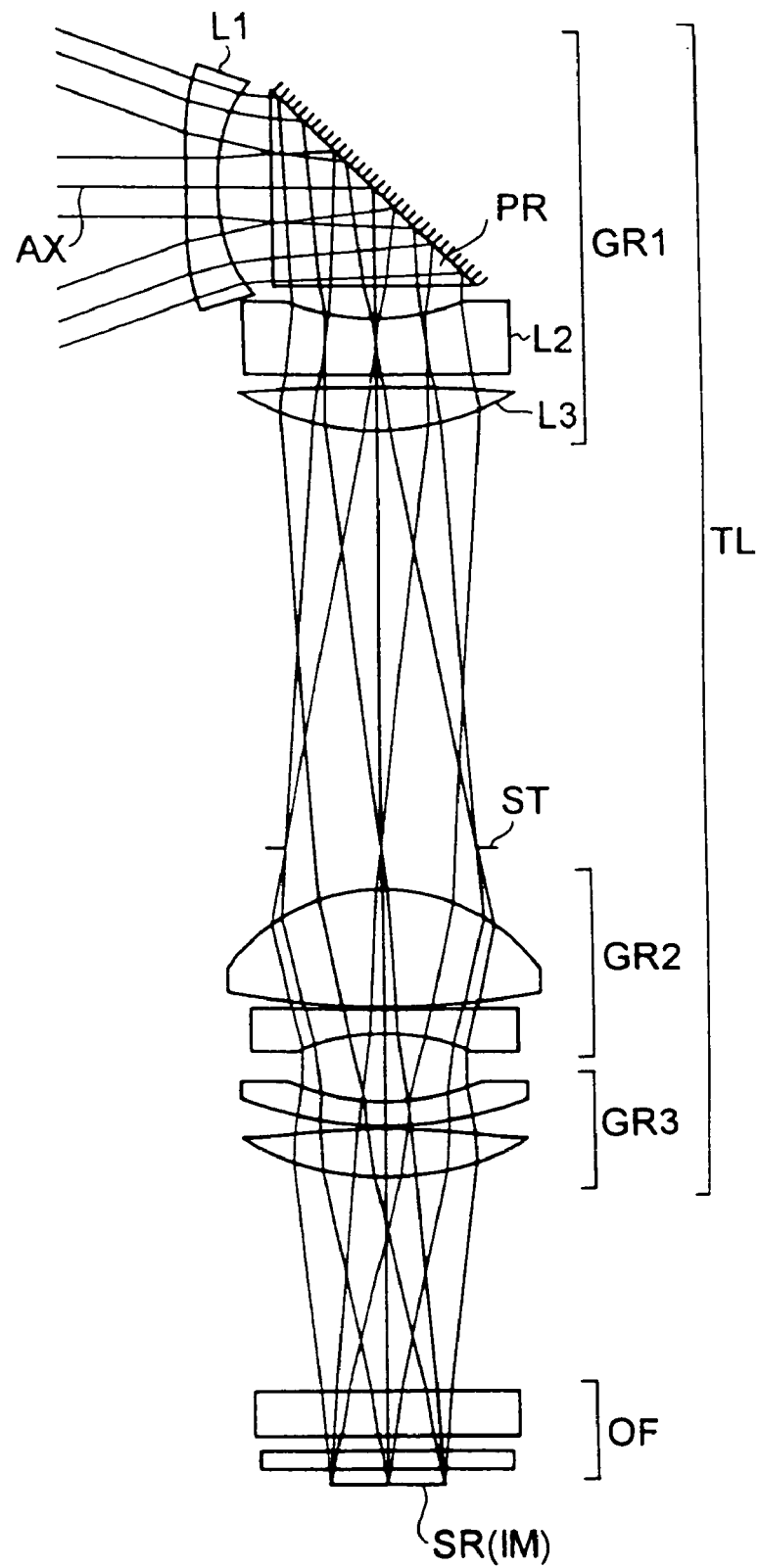
FIG. 8 is an optical construction diagram of the third embodiment (Example 3), showing its optical path and lens construction along a bent optical path.
Figure 9:
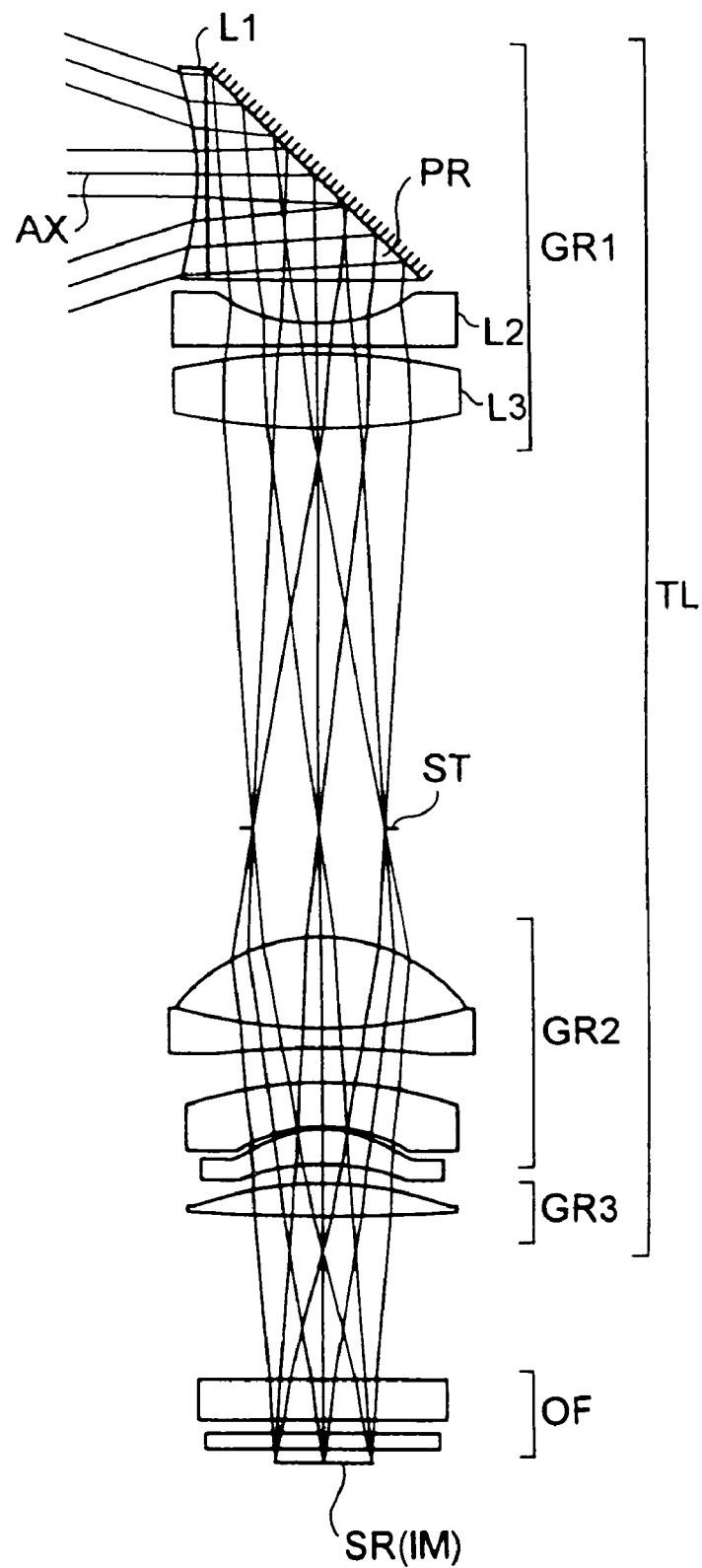
FIG. 9 is an optical construction diagram of the fourth embodiment (Example 4), showing its optical path and lens construction along a bent optical path.
Figure 10:
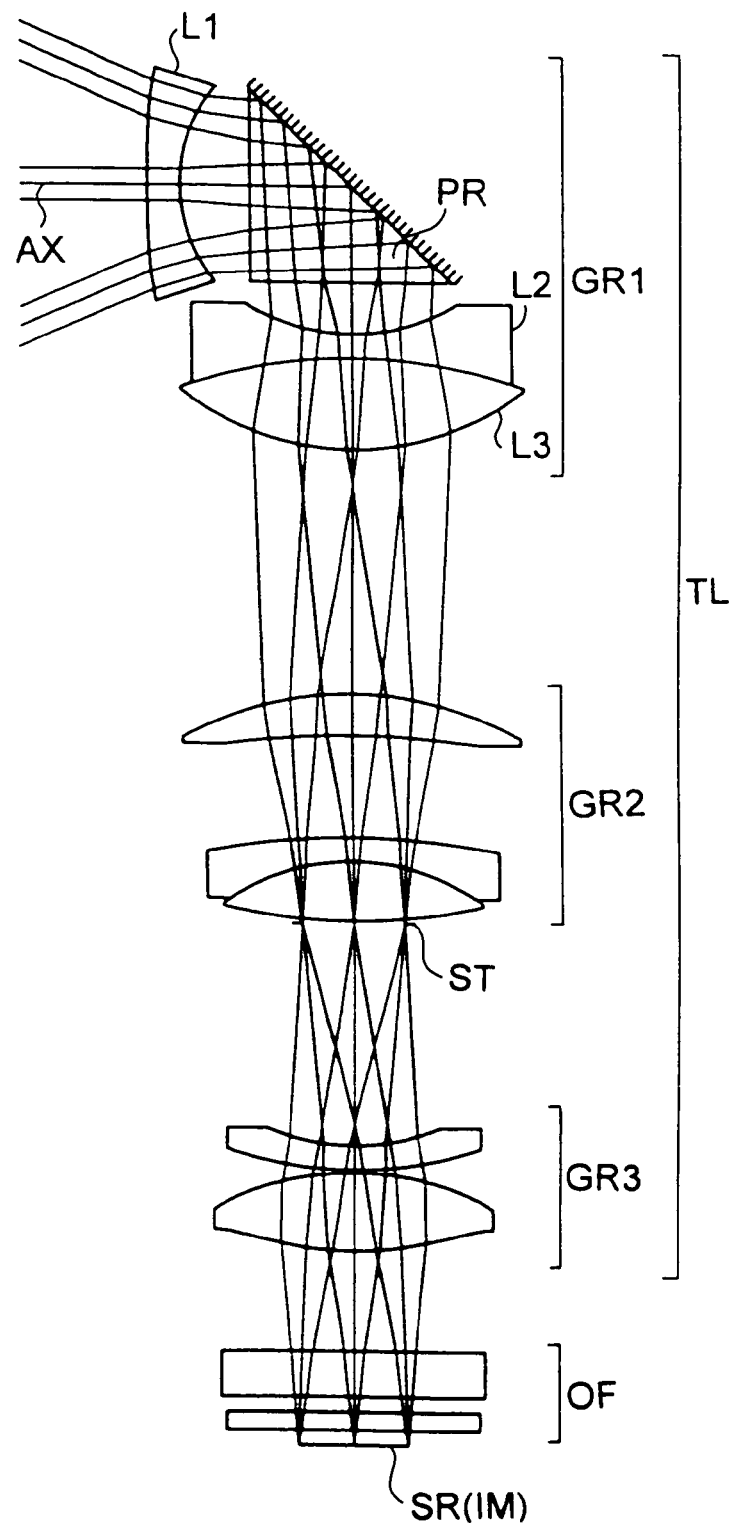
FIG. 10 is an optical construction diagram of the fifth embodiment (Example 5), showing its optical path and lens construction along a bent optical path.
Figure 11A:
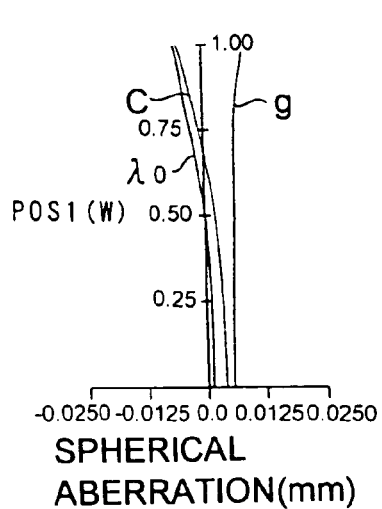
FIGS. 11A to 11I are aberration diagram of Example 1, as obtained with the focus at infinity.
Figure 11B:
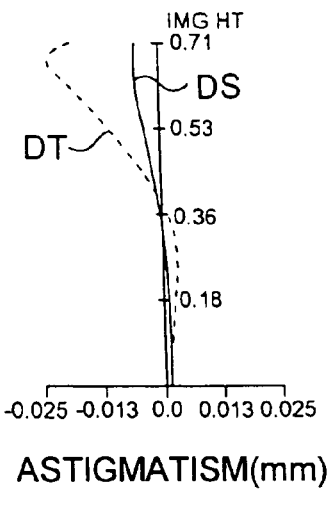
Figure 11C:
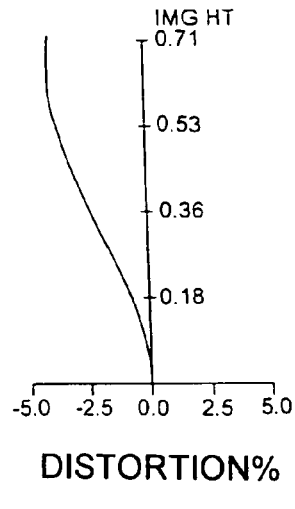
Figure 11D:
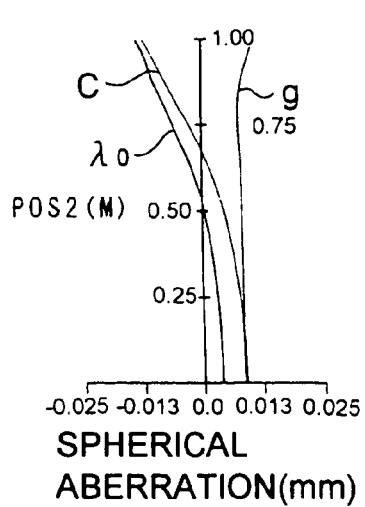
Figure 11E:
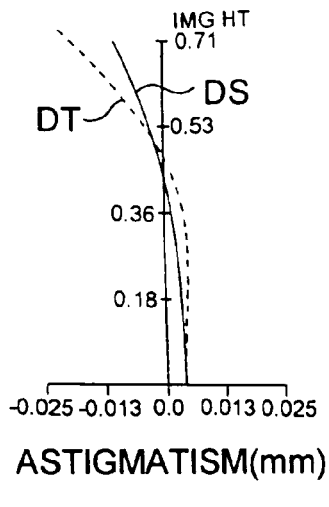
Figure 11F:
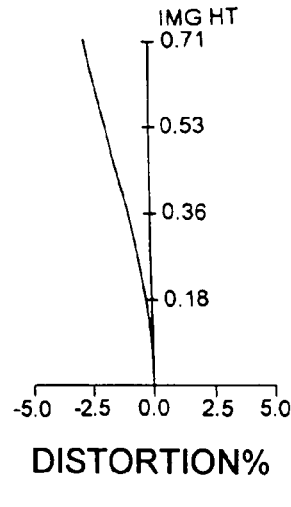
Figure 11G:
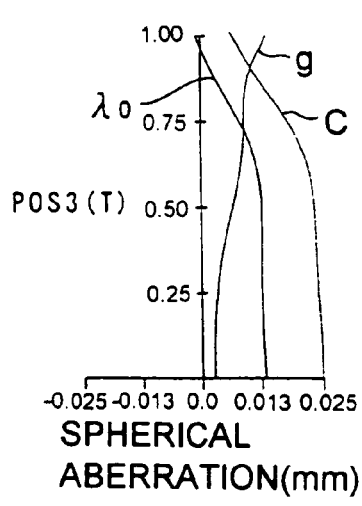
Figure 11H:
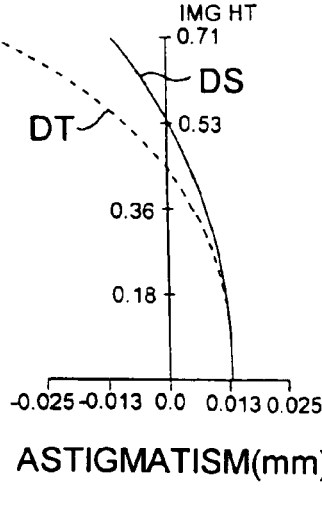
Figure 11I:
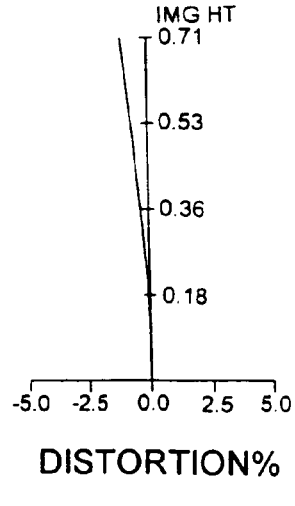
Figure 12A:
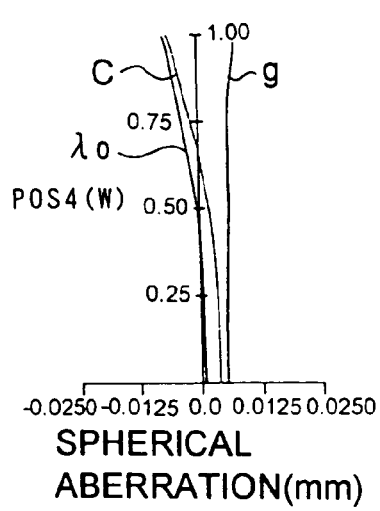
FIGS. 12A to 12I are aberration diagram of Example 1, as obtained with the focus at a close distance.
Figure 12B:
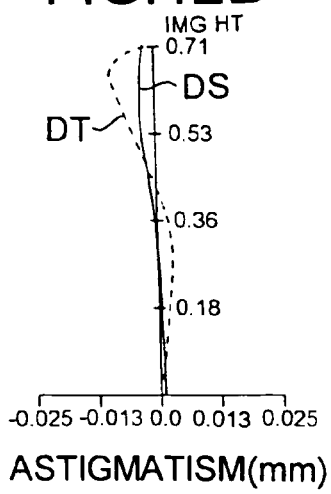
Figure 12C:
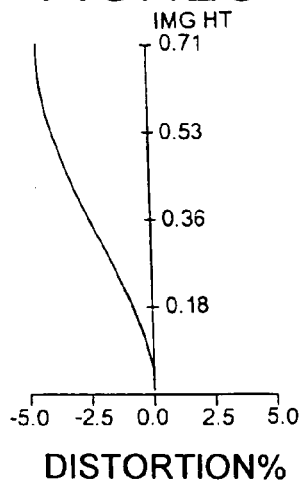
Figure 12D:
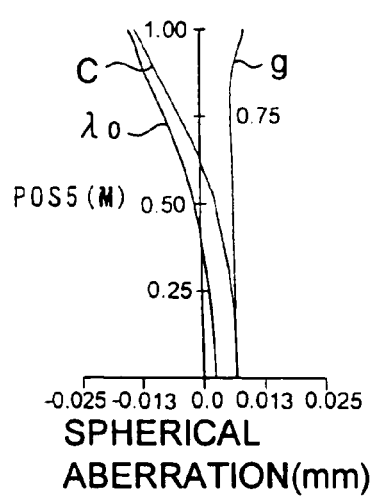
Figure 12E:
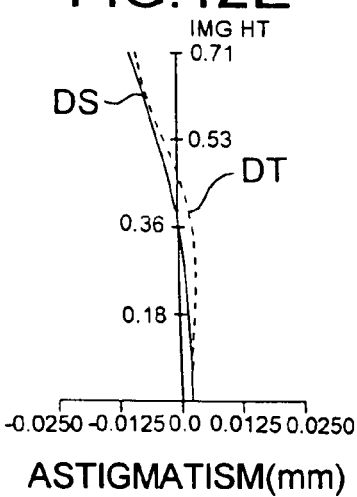
Figure 12F:
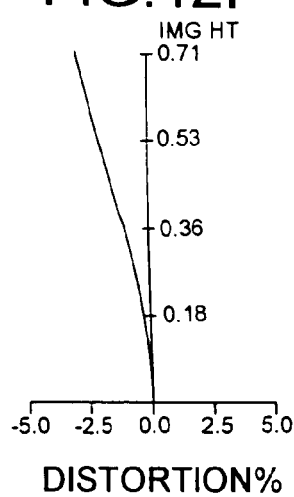
Figure 12G:
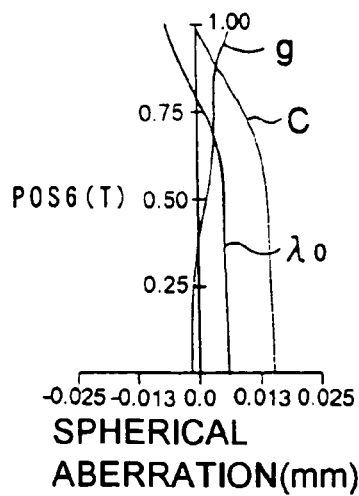
Figure 12H:
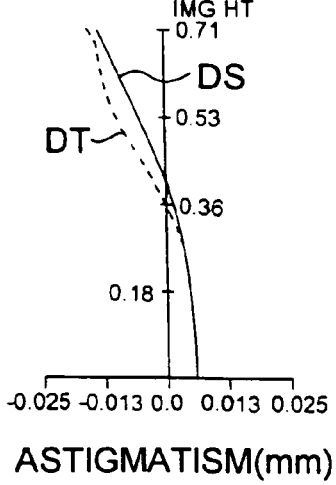
Figure 12I:
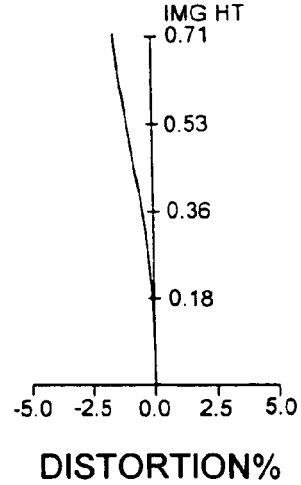
Figure 13A:
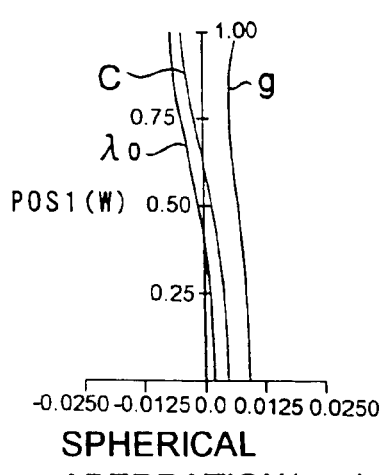
FIGS. 13A to 13I are aberration diagram of Example 2, as obtained with the focus at infinity.
Figure 13B:
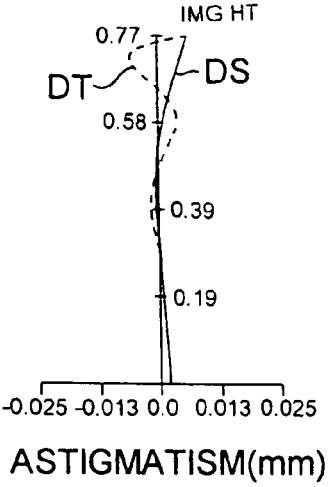
Figure 13C:
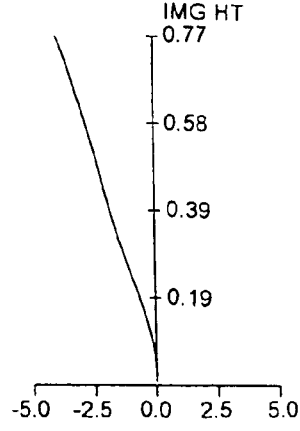
Figure 13D:
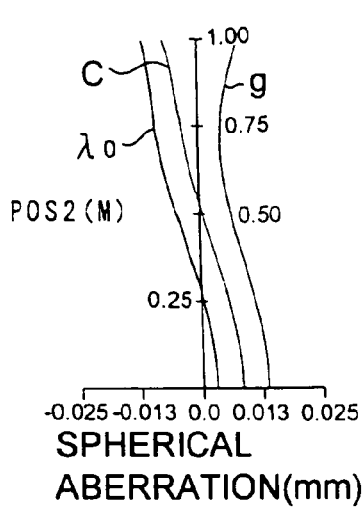
Figure 13E:
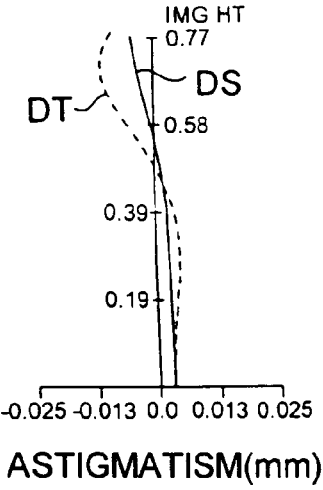
Figure 13F:
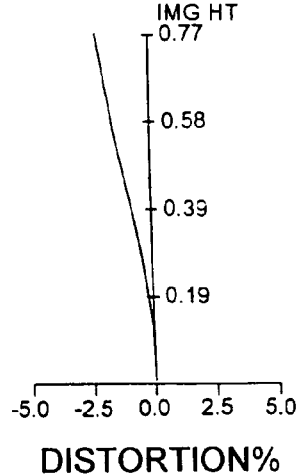
Figure 13G:
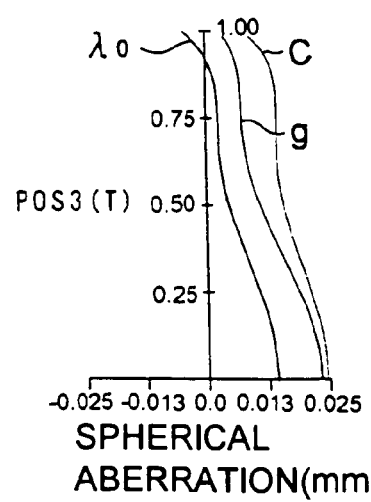
Figure 13H:
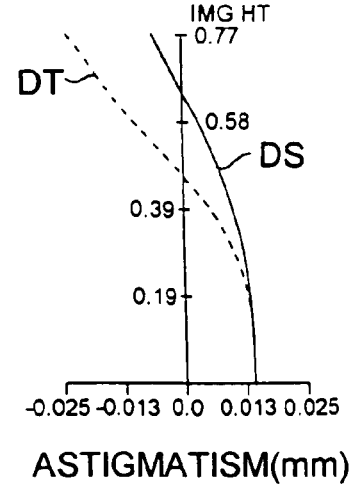
Figure 13I:
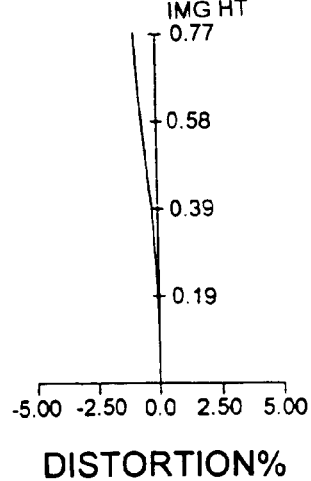
Figure 14A:
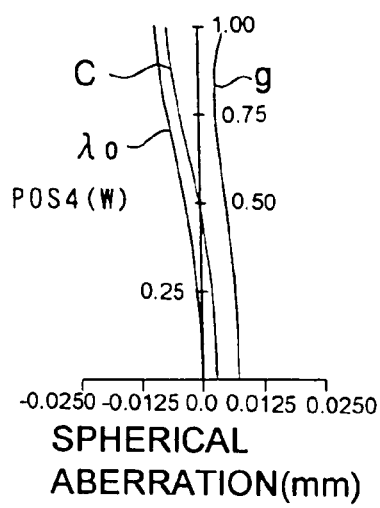
FIGS. 14A to 14I are aberration diagram of Example 2, as obtained with the focus at a close distance.
Figure 14B:
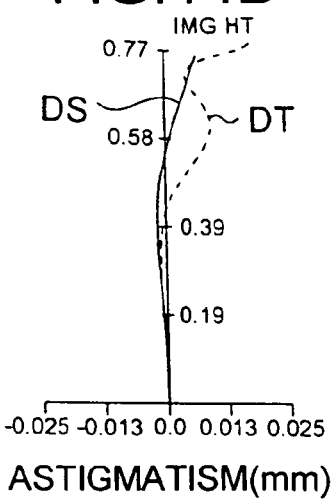
Figure 14C:
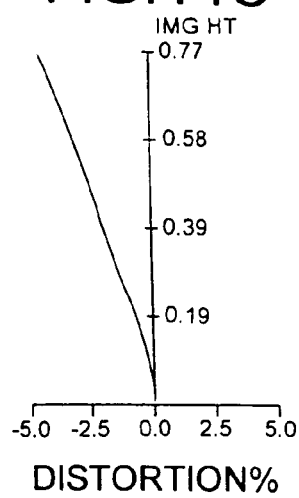
Figure 14D:
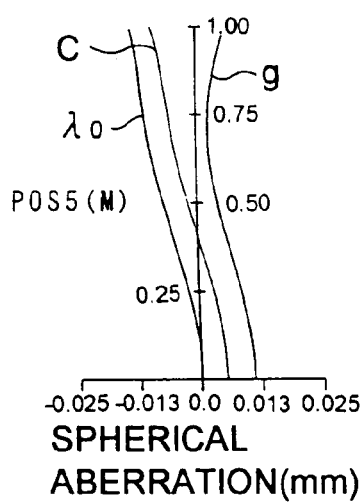
Figure 14E:
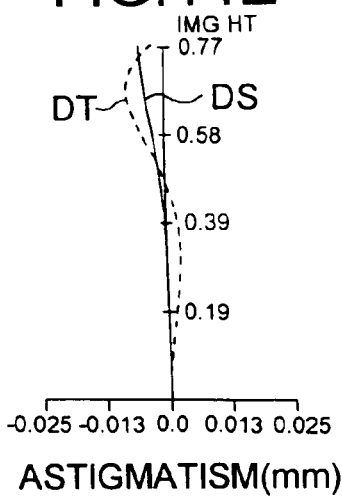
Figure 14F:
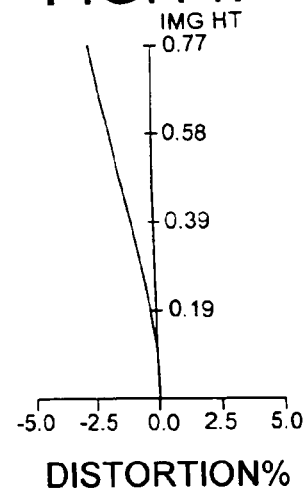
Figure 14G:
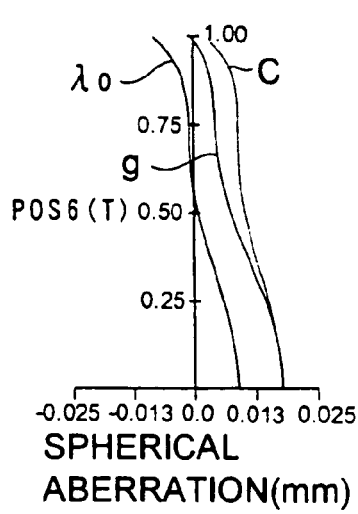
Figure 14H:
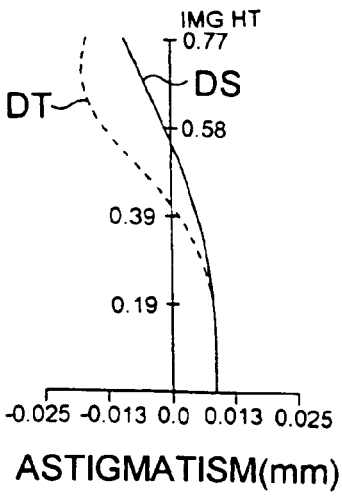
Figure 14I:
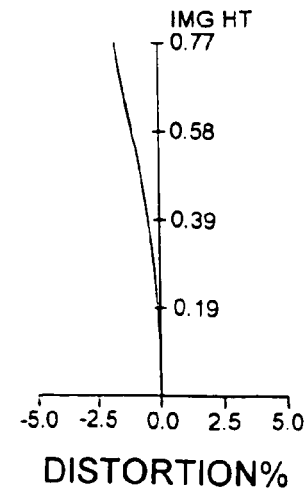
Figure 15A:
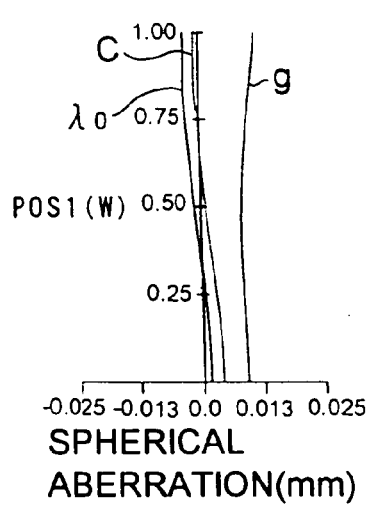
FIGS. 15A to 15I are aberration diagram of Example 3, as obtained with the focus at infinity.
Figure 15B:
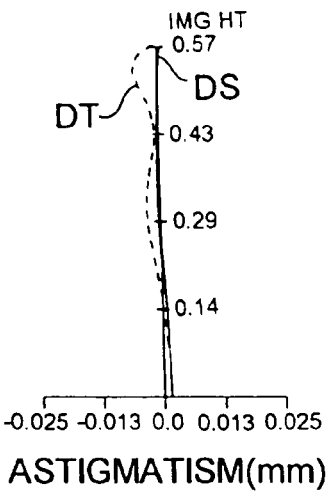
Figure 15C:
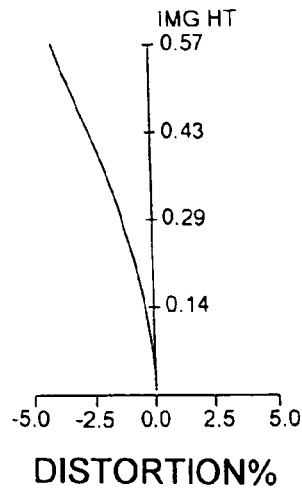
Figure 15D:
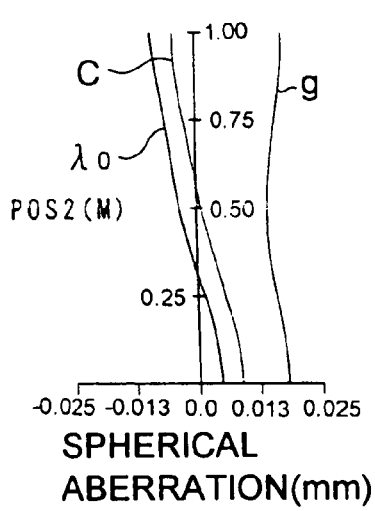
Figure 15E:
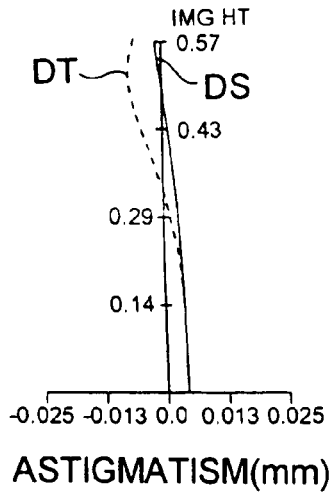
Figure 15F:
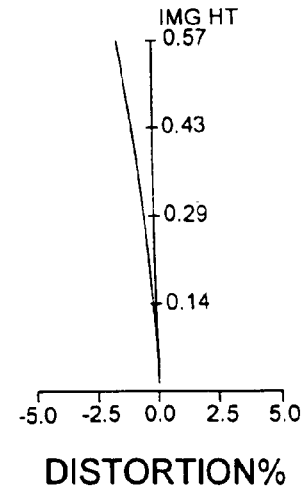
Figure 15G:
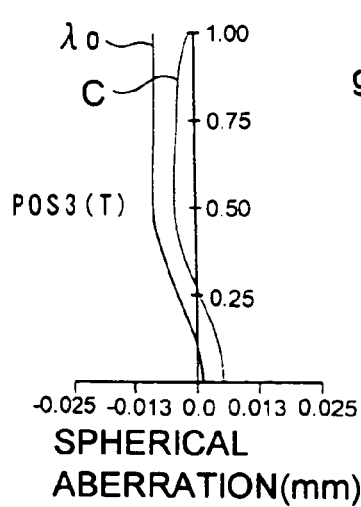
Figure 15H:
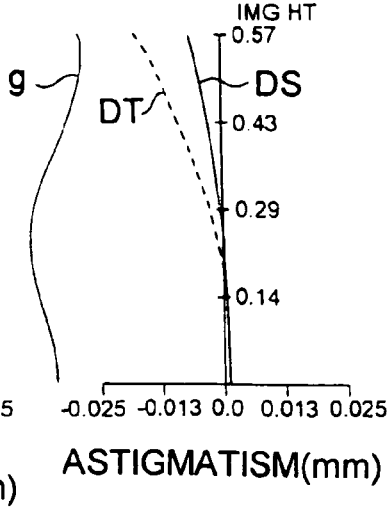
Figure 15I:
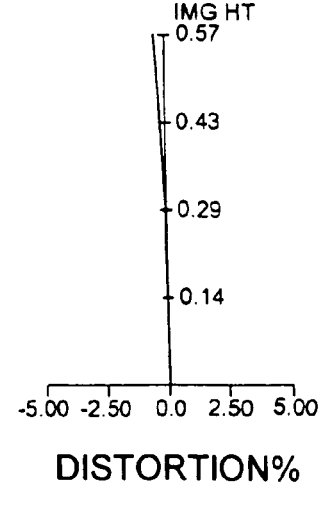
Figure 16A:
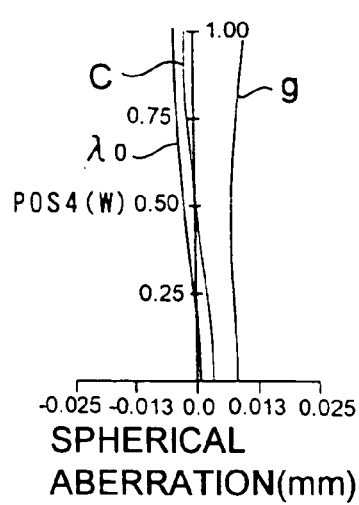
FIGS. 16A to 16I are aberration diagram of Example 3, as obtained with the focus at a close distance.
Figure 16B:
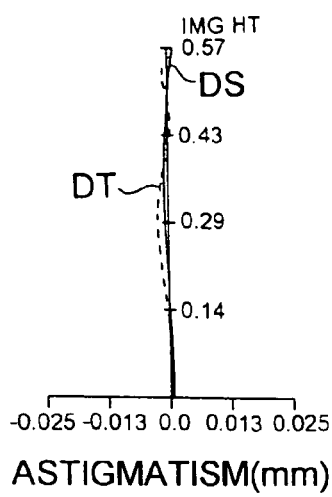
Figure 16C:
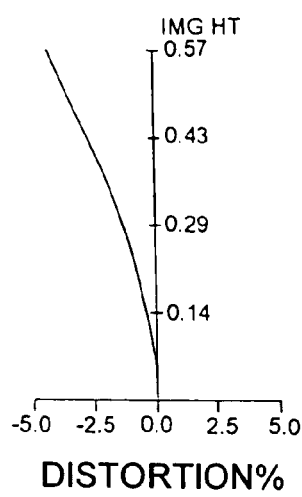
Figure 16D:
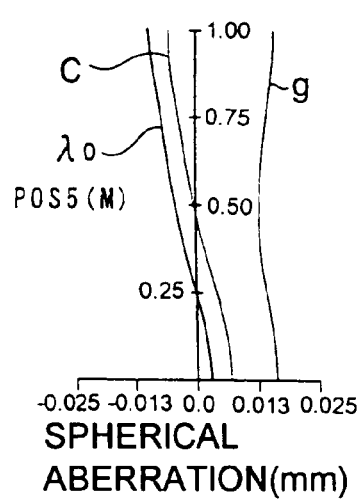
Figure 16E:
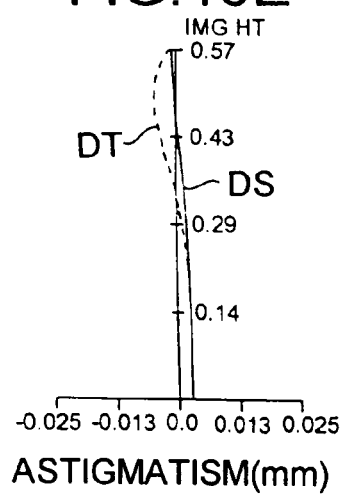
Figure 16F:
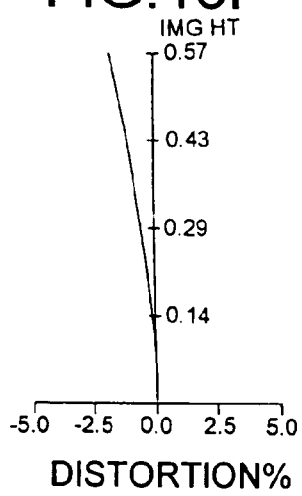
Figure 16G:
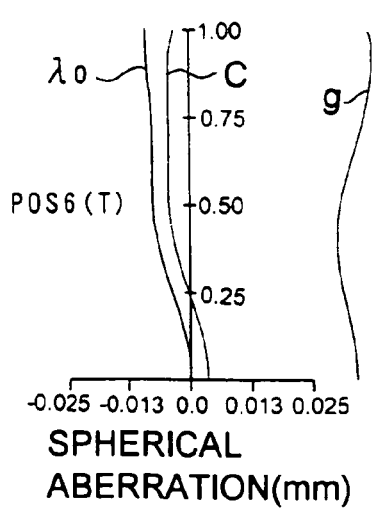
Figure 16H:
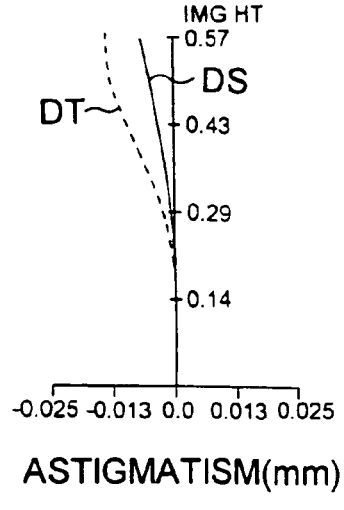
Figure 16I:
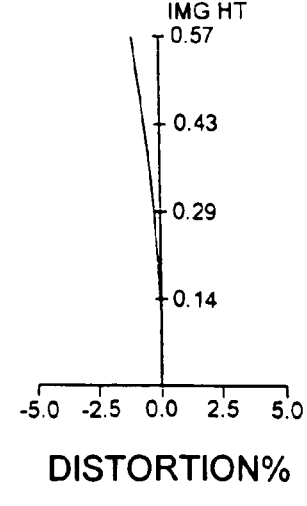
Figure 17A:
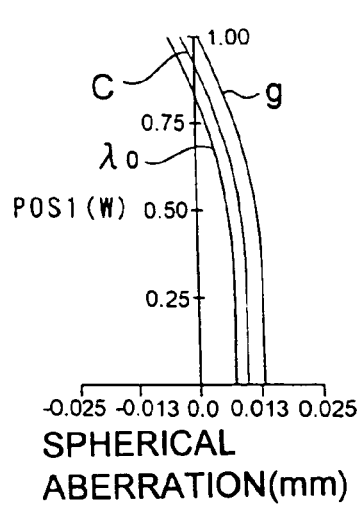
FIGS. 17A to 17I are aberration diagram of Example 4, as obtained with the focus at infinity.
Figure 17B:
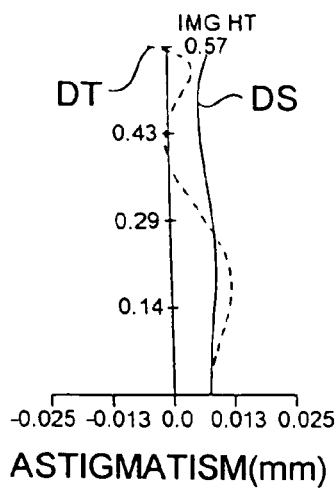
Figure 17C:
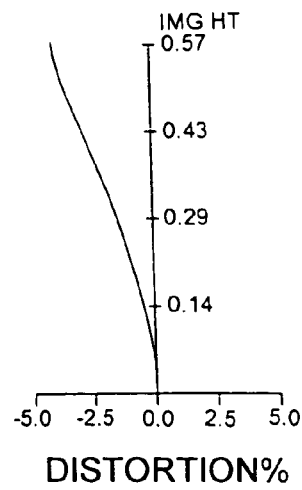
Figure 17D:
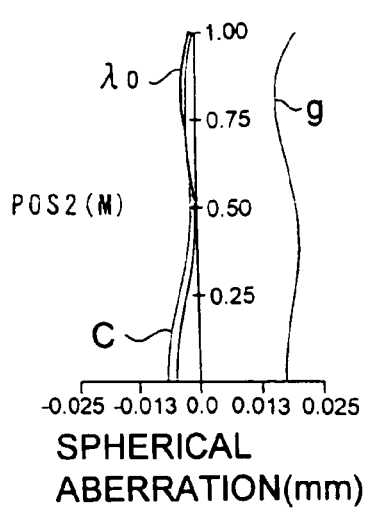
Figure 17E:
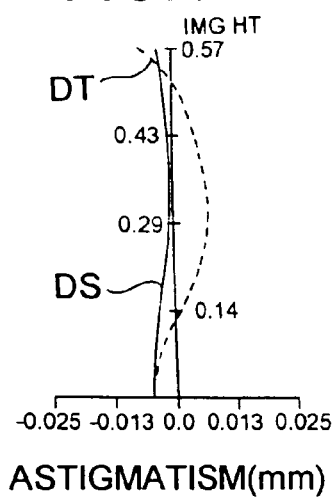
Figure 17F:
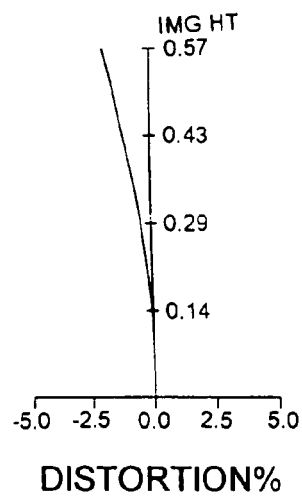
Figure 17G:
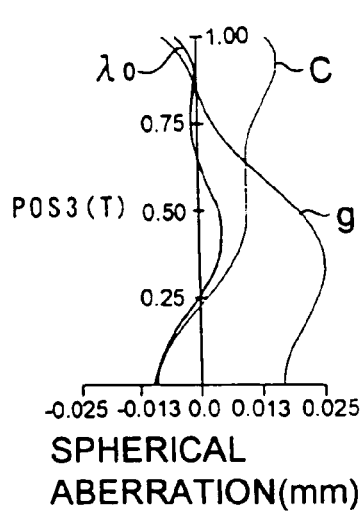
Figure 17H:
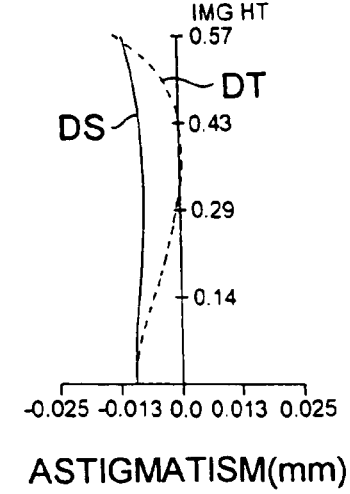
Figure 17I:
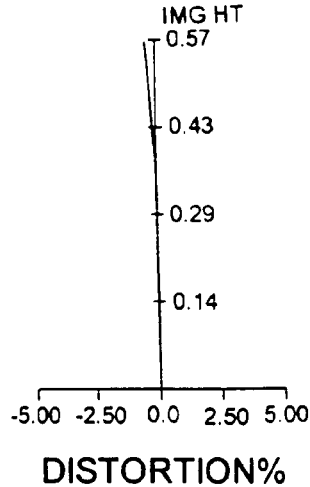
Figure 18A:
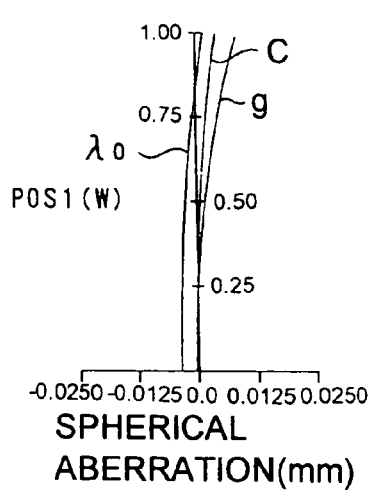
FIGS. 18A to 18I are aberration diagram of Example 5, as obtained with the focus at infinity.
Figure 18B:
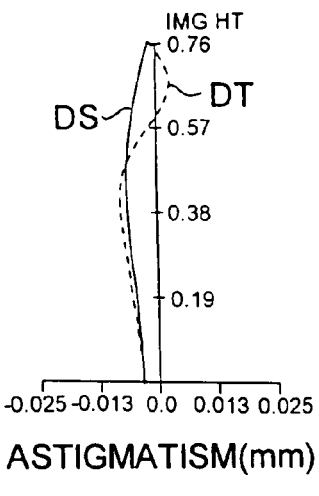
Figure 18C:
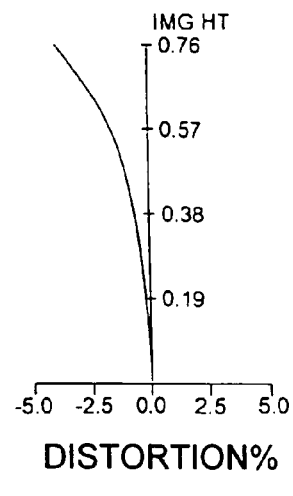
Figure 18D:
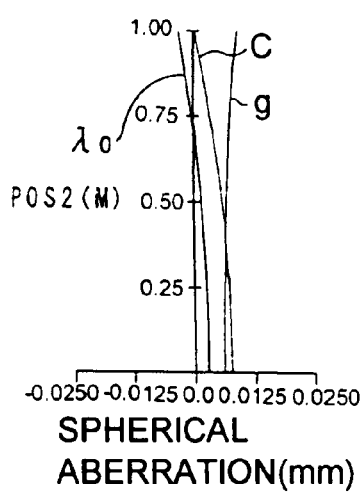
Figure 18E:
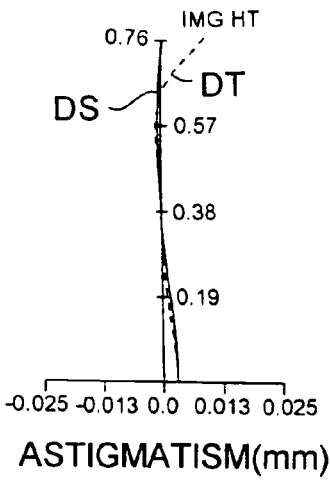
Figure 18F:
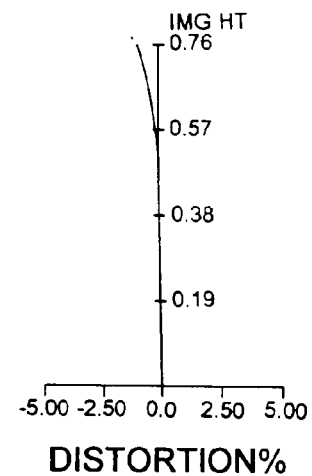
Figure 18G:
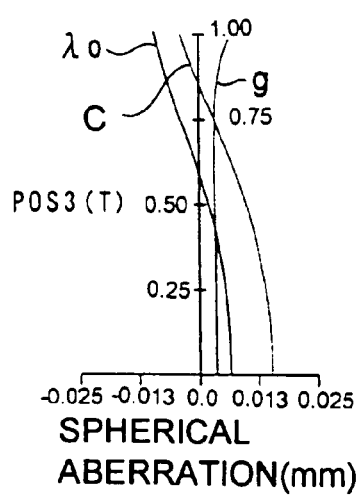
Figure 18H:
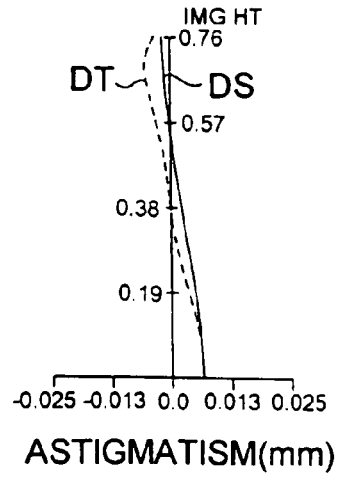
Figure 18I:
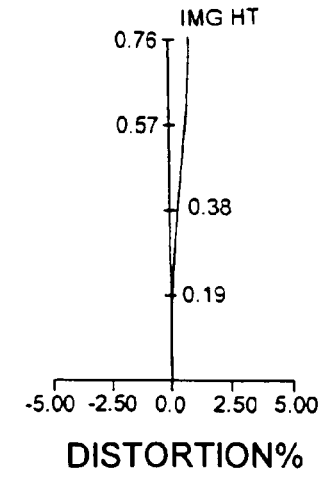
Figure 19A:
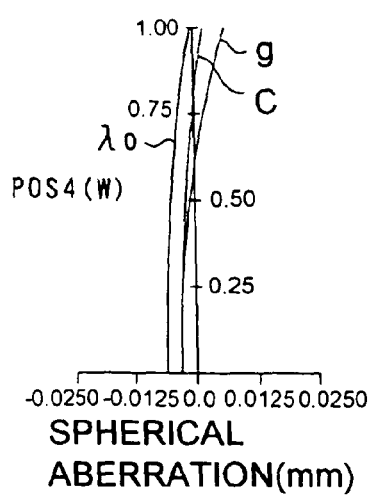
FIGS. 19A to 19I are aberration diagram of Example 5, as obtained with the focus at a close distance.
Figure 19B:
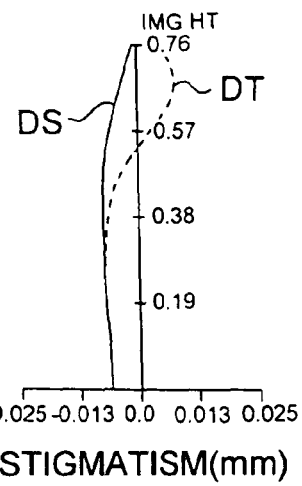
Figure 19C:
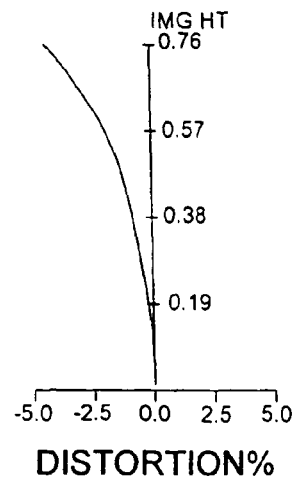
Figure 19D:
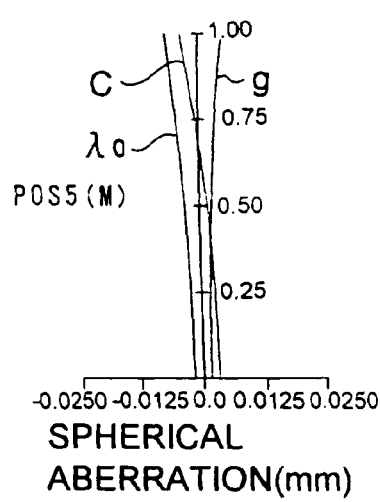
Figure 19E:
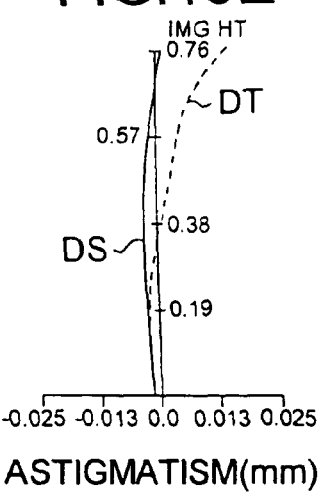
Figure 19F:
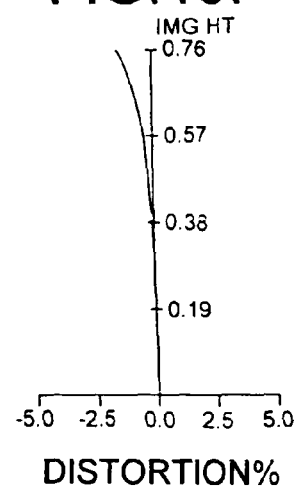
Figure 19G:
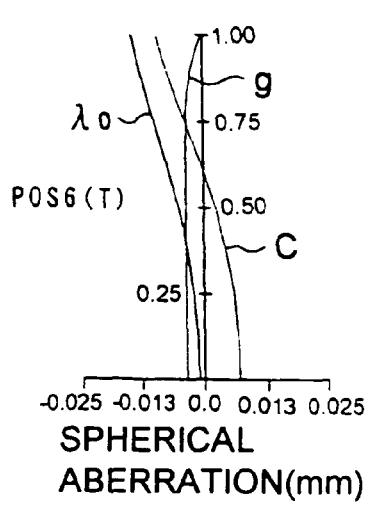
Figure 19H:
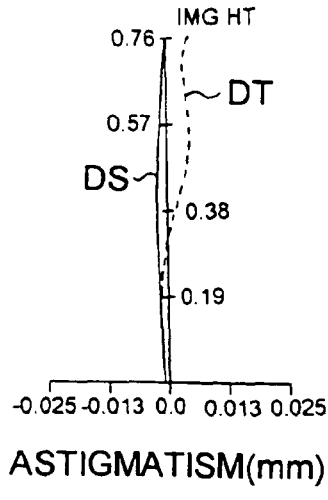
Figure 19I:
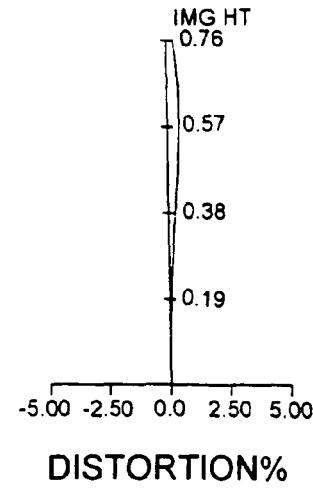

How the third lens unit GR3 moves during zooming differs between in the first to fourth embodiments (FIGS. 1 to 4) and in the fifth embodiment (FIG. 5). In the first to fourth embodiments, during zooming from the wide-angle end W to the telephoto end T, the third lens unit GR3 moves in such a way as to describe a U-shaped trajectory convex to the image side. That is, during zooming from the wide-angle end W to the telephoto end T, the third lens unit GR3 first moves from the object side to the image side and then, near the telephoto end T, moves from the image side to the object side and thereby varies its position relative to the image surface IM. The point at which the third lens unit GR3 changes its movement direction lies between the middle-focal-length position M and the telephoto end T, as will be specifically presented later with reference to numerical data. In the fifth embodiment, during zooming from the wide-angle end W to the telephoto end T, the third lens unit GR3 moves toward the image side. That is, during zooming from the wide-angle end W to the telephoto end T, the third lens unit GR3 moves monotonically from the object side to the image side and thereby varies its position relative to the image surface IM.

In all the embodiments, the first lens unit GR1 is a stationary lens unit, and thus remains stationary, together with the parallel-surface plate OF and the image sensor SR, during zooming; that is, these remain stationary relative to the image surface IM during zooming from the wide-angle end W to the telephoto end T. In the first to fourth embodiments, an aperture stop ST is disposed between the first and second lens units GR1 and GR2; in the fifth embodiment, an aperture stop ST is disposed between the second and third lens units GR2 and GR3. In the first to fourth embodiments, the aperture stop ST moves together with the second lens unit GR2 during zooming; in the fifth embodiment, the aperture stop ST, together with the first lens unit GR1, remains stationary during zooming. In all the embodiments, the zoom lens system is designed as a taking lens apparatus 10 for use in a camera 20 (FIG. 20) provided with an image sensor SR, and thus has two glass parallel-surface plates OF, corresponding to optical filters such as an optical low-pass filter and an infrared cut filter, disposed on the image surface IM side thereof. Now, the lens construction of each embodiment will be described in more detail.

The zoom lens system of the first embodiment (FIGS. 1 and 6) is a three-unit zoom lens system of a negative-positive-positive type, with each lens unit constructed as follows. The first lens unit GR1 is composed of, from the object side, a first, a second, and a third lens element L1, L2, and L3, with a prism PR disposed between the first and second lens elements L1 and L2. The first lens element L1 is a negative meniscus lens element having aspherical surfaces on both sides and concave to the image side. The prism PR is a rectangular prism having a reflective surface RL (FIG. 20) for bending the optical axis AX at 90°. The second lens element L2 is a negative biconcave lens element. The third lens element L3 is a positive biconvex lens element. The second and third lens elements L2 and L3 together form a cemented lens element. The second lens unit GR2 is composed of, from the object side, a positive meniscus lens element having aspherical surfaces on both sides and convex to the object side and a cemented lens element formed by cementing together a negative meniscus lens element concave to the image side and a positive biconvex lens element. The third lens unit GR3 is composed of, from the object side, a negative meniscus lens element concave to the object side and a positive biconvex lens element having aspherical surfaces on both sides.

The zoom lens system of the second embodiment (FIGS. 2 and 7) is a three-unit zoom lens system of a negative-positive-positive type, with each lens unit constructed as follows. The first lens unit GR1 is composed of, from the object side, a first, a second, and a third lens element L1, L2, and L3, with a prism PR disposed between the first and second lens elements L1 and L2. The first lens element L1 is a negative meniscus lens element having aspherical surfaces on both sides and concave to the image side. The prism PR is a rectangular prism having a reflective surface RL (FIG. 20) for bending the optical axis AX at 90°. The second lens element L2 is a negative biconcave lens element. The third lens element L3 is a positive biconvex lens element. The second and third lens elements L2 and L3 together form a cemented lens element. The second lens unit GR2 is composed of, from the object side, a positive meniscus lens element convex to the object side, a negative biconcave lens element, and a positive biconvex lens element having aspherical surfaces on both sides. The third lens unit GR3 is composed of, from the object side, a negative meniscus lens element concave to the object side and a positive biconvex lens element having aspherical surfaces on both sides.

The zoom lens system of the third embodiment (FIGS. 3 and 8) is a three-unit zoom lens system of a negative-positive-positive type, with each lens unit constructed as follows. The first lens unit GR1 is composed of, from the object side, a first, a second, and a third lens element L1, L2, and L3, with a prism PR disposed between the first and second lens elements L1 and L2. The first lens element L1 is a negative biconcave lens element having aspherical surfaces on both sides. The prism PR is a rectangular prism having a reflective surface RL (FIG. 20) for bending the optical axis AX at 90°. The second lens element L2 is a negative biconcave lens element. The third lens element L3 is a positive biconvex lens element. The second lens unit GR2 is composed of, from the object side, a positive biconvex lens element and a negative biconcave lens element having aspherical surfaces on both sides. The third lens unit GR3 is composed of, from the object side, a negative meniscus lens element concave to the object side and a positive biconvex lens element having aspherical surfaces on both sides.

The zoom lens system of the fourth embodiment (FIGS. 4 and 9) is a three-unit zoom lens system of a negative-positive-positive type, with each lens unit constructed as follows. The first lens unit GR1 is composed of, from the object side, a first, a second, and a third lens element L1, L2, and L3, with a prism PR disposed between the first and second lens elements L1 and L2 in intimate contact with the image-side surface of the first lens element L1. The first lens element L1 is a negative plano-concave lens element having an aspherical surface on the object side. The prism PR is a rectangular prism having a reflective surface RL (FIG. 20) for bending the optical axis AX at 90°. The second lens element L2 is a negative biconcave lens element having aspherical surfaces on both sides. The third lens element L3 is a positive biconvex lens element. The second lens unit GR2 is composed of, from the object side, a cemented lens element formed by cementing together a positive biconvex lens element and a negative biconcave lens element, a negative meniscus lens element concave to the image side, and a positive meniscus lens element having aspherical surfaces on both sides and convex to the object side. The third lens unit GR3 is composed solely of a positive biconvex lens element having an aspherical surfaces on the object side.

The zoom lens system of the fifth embodiment (FIGS. 5 and 10) is a three-unit zoom lens system of a negative-positive-positive type, with each lens unit constructed as follows. The first lens unit GR1 is composed of, from the object side, a first, a second, and a third lens element L1, L2, and L3, with a prism PR disposed between the first and second lens elements L1 and L2. The first lens element L1 is a negative meniscus lens element having aspherical surfaces on both sides and concave to the image side. The prism PR is a rectangular prism having a reflective surface RL (FIG. 20) for bending the optical axis AX at 90°. The second lens element L2 is a negative biconcave lens element. The third lens element L3 is a positive biconvex lens element. The second and third lens elements L2 and L3 together form a cemented lens element. The second lens unit GR2 is composed of, from the object side, a positive meniscus lens element having an aspherical surface on the object side and convex to the object side and a cemented lens element formed by cementing together a negative meniscus lens element concave to the image side and a positive biconvex lens element. The third lens unit GR3 is composed of, from the object side, a negative meniscus lens element concave to the object side and a positive biconvex lens element having aspherical surfaces on both sides.

As described above, in all the embodiments, the zoom lens system is composed of three, i.e., from the object side, a negative, a positive, and a positive, zoom units GR1 to GR3, and the first lens unit GR1 includes a prism PR as a reflective member. In all the embodiments, a rectangular prism is used as the prism PR, and this prism PR serves as the reflective surface RL (FIG. 20) mentioned above. That is, as shown in FIGS. 6 to 10, the prism PR is so designed as to reflect a light beam with the reflective surface RL provided inside it so that the optical axis AX of the zoom lens system is bent at substantially 90°. The prism PR may be a prism of any other type than a rectangular prism; for example, it may be a prism that bends the optical axis AX at substantially 90° with two or more reflective surfaces RL.

The screen of a common image sensor is rectangular in shape, and so is the screen of the image sensor SR used in each embodiment, specifically, it has the shape of a rectangle of which the longer and shorter sides fulfill a ratio of 4:3 in length. Thus, to make the taking lens apparatus 10 slim, it is preferable to bend the optical path in the direction of the shorter sides of the image sensor SR. It is to be noted that, while in FIGS. 6 to 10 the optical path is bent in the direction of the shorter sides of the image sensor SR, in FIGS. 1 to 5 the prism PR is illustrated as a parallel-surface plate so that the optical path is shown in a straightened form.

In all the embodiments, used as the prism PR is an internal-reflection prism; however, it is also possible to use a prism of any other type. As the reflective member that serves as the reflective surface RL, it is possible to use any of a surface-reflection prism, an internal-reflection flat mirror, a surface-reflection flat mirror, and the like. While an internal-reflection prism reflects the object light inside itself, a surface-reflection prism reflects the object light with a surface thereof serving as the reflective surface RL without letting the object light enter it. On the other hand, while a surface-reflection flat mirror reflects the object light with a mirror surface thereof serving as the reflective surface RL, an internal-reflection flat mirror reflects, with the back surface of a glass plate serving as the reflective surface RL, the object light that has entered the glass plate.

Of the different types of reflective member mentioned above, the internal-reflection prism is most suitable to make the camera 20 slim. In a case where an internal-reflection prism is adopted, the object light passes through the medium of the prism and thus travels a physically shorter axial distance than otherwise. Thus, it is preferable to realize the reflective surface RL with an internal-reflection prism, because it helps realize an optically equivalent construction with less space. The reflective surface RL does not have to be a perfectly total-reflection surface. That is, the reflectivity of part of the reflective surface RL may be appropriately adjusted so as to make part of the object light branch off and strike a sensor for metering or distance measurement. The reflectivity of the entire reflective surface RL may be adjusted appropriately so as to split the object light into two beams and direct one to a viewfinder.

In a case, as in a conventional taking lens apparatus, where the optical elements, such as lens elements and aperture stop, constituting a zoom lens system are arranged linearly, the dimension of the taking lens apparatus in the thickness direction is practically determined by the distance from the most object-side optical element of the zoom lens system to an image sensor. On the other hand, as the image processing power of semiconductor devices and the like increases, taking lens apparatuses incorporated in personal computers, mobile computers, cellular phones, personal digital assistants, and the like have come to be required to offer increasingly high resolution, high magnification, and high image quality, as opposed to conventional simple types. Correspondingly, zoom lens systems for use in such taking lens apparatuses have come to include an increasingly large number of lens elements. This makes it difficult to achieve satisfactory slimness because of the thickness of lens elements even in the not-in-use state (i.e., the collapsed state).

By contrast, as in the zoom lens systems of all the embodiments, adopting a construction in which the object light is reflected with the reflective surface RL so that the optical axis AX is bent at substantially 90° makes it possible to reduce the dimension of the taking lens apparatus 10 in the thickness direction down to the distance from the most object-side lens element, namely the first lens element L1, to the reflective surface RL. This helps make the taking lens apparatus 10 apparently slim and compact. Moreover, adopting a construction in which the optical axis AX is bent at substantially 90° with a reflective surface RL permits the optical path of the object light to have an overlap near the reflective surface RL. This makes it possible to effectively use space and thereby make the taking lens apparatus 10 more compact.

It is preferable that, as in all the embodiments, the reflective surface RL be disposed inside the first lens unit GR1. Disposing the reflective surface RL inside the first lens unit GR1, which is disposed at the object-side end of the zoom lens system, makes it possible to minimize the dimension of the taking lens apparatus 10 in the thickness direction. As necessary, the optical axis AX may be bent at an angle other than 90°. However, the closer to 90° the angle at which the optical axis AX is bent is, the more compact the taking lens apparatus 10 can be made. Moreover, as necessary, the reflective surface RL of the reflective member may be given an optical power, or, instead of the reflective surface RL, a refractive or diffractive surface may be used to bend the optical axis AX.

In a case, as in all the embodiments, where a bending optical system is built with a reflective member such as a prism PR, it is preferable that condition (1) below be fulfilled.

$$2.5 < D_{ref}/Y_{max} < 4 \tag{1}$$

where $D_{ref}$ represents the sum of the axial distances between the object-side optical component located immediately in front of the reflective member and the image-side optical component located immediately behind the reflective member; and $Y_{max}$ represents the maximum image height.

Condition (1) defines the construction around the reflective member that is most suitable to make a camera such as a digital camera slim. If the upper limit of condition (1) is transgressed, the portion where the optical path is bent is unduly large. This makes it impossible to reduce the apparent thickness of the zoom lens system, and thus makes it impossible to realize a slim digital camera. By contrast, if the lower limit of condition (1) is transgressed, it is difficult to secure a space necessary to bend the optical path, and thus vignetting occurs in the portion where the optical path is bent.

It is further preferable that at least one of conditions (1a) and (1b) below be fulfilled.

$$2.5 < D_{ref}/Y_{max} < 3.7 \tag{1a}$$

$$3.0 < D_{ref}/Y_{max} < 4 \tag{1b}$$

Conditions (1a) and (1b) define further preferable conditional ranges within that defined by condition (1) above from the aforementioned viewpoints. Fulfilling condition (1a) makes it possible to effectively make the camera 20 slim, and fulfilling condition (1b) makes it possible to effectively avoid vignetting in the portion where the optical path is bent. Accordingly, fulfilling (1a) and (1b) makes it possible to realize a desirable optical construction that is slim but that nevertheless is free from vignetting.

In general, zoom lens systems of a negative-positive-positive type are unsuitable for high zoom ratios of 5× to 10×. This is because attempting high-zoom-ratio zooming with this zoom construction results in the first and second lens units GR1 and GR2 having unduly large lens diameters at the telephoto end T. However, when applied to zoom lens systems having a zoom ratio of about 3× as in the embodiments, this zoom construction helps reduce the number of lens units and the sensitivity to decentering errors as compared with zoom lens systems in which the first lens unit GR1 has a positive optical power (of a so-called positive-led type). Thus, the negative-positive-positive zoom construction adopted in all the embodiments is preferable because it has the advantages of small manufacturing errors and a smaller number of lens units. A lens unit (for example, a lens unit that functions as a condenser) that remains stationary relative to the image surface IM during zooming from the wide-angle end W to the telephoto end T may additionally be disposed near the image surface IM. Additionally disposing near the image surface IM a lens unit that remains stationary during zooming and that has a positive or negative optical power is expected to achieve a slight improvement in performance. Even in that case, the same advantages are obtained as those offered by the zoom lens systems of the embodiments.

It is preferable that, as in all the embodiments (FIGS. 1 to 10), the first lens unit GR1 remain stationary during zooming. That is, it is preferable to build a zoom lens system with, from the object side, a first lens unit GR1 including a reflective member and having a negative optical power, a second lens unit GR2 having a positive optical power, and a third lens unit GR3 having a positive optical power and keep the first lens unit GR1 stationary relative to the image surface IM during zooming from the wide-angle end W to the telephoto end T. Keeping the first lens unit GR1 stationary during zooming helps reduce the length, along the optical axis AX, of the zoom lens system at the entrance side thereof. This helps make the zoom lens system compact, give it a high magnification, and make the taking lens apparatus 10 and the camera 20 slim.

Since the first lens unit GR1 includes the reflective surface RL, attempting to move the first lens unit GR1 requires a large space. In particular in a case where the reflective surface RL is realized with a prism PR, attempting to move the prism PR, which is heavy, places a heavy burden on the drive mechanism. This problem can be avoided by keeping the first lens unit GR1 stationary relative to the image surface IM during zooming as described above, and it is thereby possible to realize a zoom lens system of which the total length does not vary (that is, of which the thickness does not vary as a result of zooming or the collapsing of the lens barrel). A zoom lens system of which the total length does not vary can be held with a box-shaped structure, and this makes it possible to hold the zoom lens system with a highly rigid structure.

Zoom lens systems of a negative-positive-positive type are classified roughly into two types with respect to how their constituent lens units are moved to achieve zooming. In the first type, during zooming from the wide-angle end W to the telephoto end T, the second and third lens units GR2 and GR3 both move toward the object side but at different speeds. In the second type, during zooming from the wide-angle end W to the telephoto end T, the second lens unit GR2 moves toward the object side, and the third lens unit GR3 either moves linearly toward the image side or moves so as to describe a U-shaped trajectory convex to the image side. The reason that the two types greatly differ in zoom movement is that they greatly differ in how the responsibility for zooming is shared between the individual lens units.

In the first type, the second lens unit GR2 increases the magnification, and the second lens unit GR2 decreases it. In this case, the second lens unit GR2 alone needs to be responsible for a zoom ratio higher than that of the entire system, and this undesirably causes large variations in the aberrations produced by the second lens unit GR2. In the second type, the second and third lens units GR2 and GR3 share the responsibility for zooming, causing only small variations in aberrations. This makes it possible to satisfactorily suppress aberrations over the entire zoom range even with a smaller number of lens elements. Accordingly, it is preferable that, as in all the embodiments, during zooming from the wide-angle end W to the telephoto end T, the second lens unit GR2 be moved toward the object side and the third lens unit GR3 either be moved toward the image side or be moved so as to describe a U-shaped trajectory convex to the image side. Here, as opposed to the movement of the third lens unit GR3 describing a U-shaped trajectory convex to the image side, the movement of the second lens unit GR2 toward the object side and the movement of the third lens unit GR3 toward the image side are linear (i.e., monotonic).

To perform zooming of the second type described above, the second lens unit GR2 alone needs to be responsible for a zoom ratio lower than that of the entire system. Specifically, it is preferable that condition (2) below be fulfilled $$1.0 < (ft \cdot m2w)/(fw \cdot m2t) \quad (2)$$

where
  fw represents the focal length of the zoom lens system as a whole at the wide-angle end W;
  ft represents the focal length of the zoom lens system as a whole at the telephoto end T;
  m2w represents the imaging magnification with the second lens unit at the wide-angle end W; and
  m2t represents the imaging magnification with the second lens unit at the telephoto end T.

If the lower limit of condition (2) is transgressed, the second lens unit GR2 is responsible for too high a zoom ratio. This makes it difficult to obtain satisfactory optical performance. From this viewpoint, it is further preferable that condition (2a) below be fulfilled. Fulfilling condition (2a) makes it possible to obtain better performance.

$$1.2 < (ft \cdot m2w)/(fw \cdot m2t) \quad (2a)$$

As described earlier, the first lens unit GR1 includes, as a reflective member, the prism PR that reflects a light beam so that the optical axis AX of the zoom lens system is bent at substantially 90°. Here, it is preferable that, as in the zoom lens systems of the embodiments, a lens element having an aspherical surface and having a negative optical power be disposed, as the first lens element L1, on the object side of the reflective member. By disposing a single lens element on the object side of the reflective member such as the prism PR, i.e., by disposing, as an optical element having an optical power, only the first lens element L1 on the object side of the reflective member, it is possible to reduce the width of the zoom lens system with its optical axis AX bent (i.e., the dimension of the zoom lens system at the entrance side thereof along the optical axis AX), and thereby make the taking lens apparatus 10 slim.

In all the embodiments, the entrance-side surface and exit-side surface of the prism PR are both flat, and in addition, in the fourth embodiment, the exit-side surface of the first lens element L1 is also flat. Moreover, in the fourth embodiment, the exit-side surface of the first lens element L1 and the entrance-side surface of the prism PR are cemented together (i.e., with a zero axial distance), and, as will be specifically presented later with reference to numerical data, the first lens element L1 and the prism PR are formed of the same glass material. Thus, in the fourth embodiment, the first lens element L1 and the internal-reflection prism PR may be regarded as a single component. That is, the combination of the first lens element L1 and the prism PR is equivalent to a prism having a concave surface on the object side, or a prism having a concave surface on the entrance side.

In a zoom lens system, like those of the embodiments, in which the first lens unit GR1 has a negative optical power, it is, in general, extremely difficult to correct the distortion and curvature of field that occur at the wide-angle end W. This problem can usually be solved by increasing the number of lens elements, but increasing the number of lens elements may lead to less satisfactory suppression of aberrations. For example, in a case, as in the first embodiment, where a prism PR is inserted between the first lens element L1 and the cemented lens element L2 and L3, the first lens unit GR1 has the image-side principal point thereof moving farther toward the object side and has a weaker optical power than in a case where no prism PR is disposed. Thus, to obtain the same optical power, it is necessary to give the individual lens elements stronger optical powers. However, giving them stronger optical powers causes larger curvature of field. In all the embodiments, an aspherical surface is introduced in the first lens element L1 so as to correct the distortion, astigmatism, and other aberrations inevitable in this construction. Moreover, introducing an aspherical surface in the first lens element L1 permits the first lens element L1 to be given a stronger optical power, and this in turn helps reduce the width of the optical path at the reflective member.

To obtain the above advantages, it is preferable to introduce in the first lens element L1 an aspherical surface that makes the negative optical power of the first lens element L1 the weaker the farther away from the optical axis AX. Specifically, it is preferable that condition (3) below be fulfilled.

$$0 < Xa - Xb \quad (3)$$

where

Xa represents the displacement along the optical axis AX from the paraxial curvature within the maximum effective range on the object-side surface of the first lens element L1 (a displacement toward the image side is assumed to be positive); and Xb represents the displacement along the optical axis AX from the paraxial curvature within the maximum effective range on the image-side surface of the first lens element L1 (a displacement toward the image side is assumed to be positive).

Condition (3) defines the sum of the effects of the aspherical surfaces formed on the object-side and image-side surfaces of the first lens element L1. As the displacement Xa increases, the positive optical power of the first lens element L1 increases, and, as the displacement Xb increases, the negative optical power of the first lens element L1 increases. When condition (3) is fulfilled, the displacement Xa is greater than the displacement Xb, and therefore a strong positive optical power acts on rays within the maximum effective range. Thus, the farther away from the optical axis AX, the weaker the negative optical power of the first lens element L1. This makes it possible to satisfactorily correct the distortion and astigmatism produced by the negative optical power. If condition (3) is not fulfilled, the aspherical surfaces of the first lens element L1 act to amplify distortion and astigmatism. This makes it difficult to obtain satisfactory optical performance.

Building the first lens unit GR1 solely with the first lens element L1 and the reflective member contributes to compactness, but makes it impossible to correct chromatic and other aberrations. Thus, for satisfactory correction of various kinds of aberration, it is preferable that a lens unit composed of at least one negative lens element and at least one positive lens element be disposed on the image side of the reflective member such as the prism PR. Accordingly, it is preferable that the first lens unit GR1 be composed of, from the object side, a first lens element L1 having an aspherical surface and having a negative optical power, a reflective member that reflects a light beam so that the optical axis of the zoom lens system is bent at substantially 90°, and a lens unit composed of at least one negative lens element and at least one positive lens element. It is further preferable that the lens unit that is disposed on the image side of the reflective member have a positive optical power.

Moreover, it is preferable that, as the lens unit mentioned above, a cemented lens element formed by cementing together a negative lens element as the second lens element L2 and a positive lens element as the third lens element L3 be disposed on the image side of the reflective member such as the prism PR in the first lens unit GR1, and it is further preferable that, as in the first, second, and fifth embodiments, a cemented lens element formed by cementing together a negative biconcave lens element as the second lens element L2 and a positive biconvex lens element as the third lens element L3 be disposed as the lens unit mentioned above. A cemented lens element is easy to assemble into a zoom lens system, and therefore disposing on the image side of the reflective member a cemented lens element composed of two, i.e., a negative and a positive, lens elements makes it possible to satisfactorily correct aberrations in a simple construction.

As described earlier, in all the embodiments, the zoom lens system achieves zooming by keeping the first lens unit GR1 stationary and moving the second and third lens units GR2 and GR3. In conventional zoom lens systems of a negative-positive-positive type, it is common to correct variations in aberrations by moving the first lens unit during zooming while building the third lens unit with a single lens element. However, in a case where the first lens unit is kept stationary during zooming, the third lens unit suffers comparatively great variations in aberrations, and therefore, if it is built with a single lens element, it is difficult to correct variations in aberrations that accompany zooming. Accordingly, it is preferable that, as in the first to third and fifth embodiments, the third lens unit GR3 be composed of at least one negative lens element and at least one positive lens element. Using at least one negative lens element and at least one positive lens element in this way makes it possible to correct chromatic and other aberrations and thereby maintain satisfactory optical performance. For better correction of various kinds of aberration, it is further preferable that, as in the first to third and fifth embodiments, the third lens unit GR3 be composed of, from the object side, a negative meniscus lens element convex to the image side and a positive lens element.

To make a digital camera slim, its optical components, such as lens elements and prism, need to be arranged in a narrow space. In addition, the construction including the lens barrel and drive components needs to be compact. In the first to fourth embodiments, the aperture stop ST is disposed on the object side of the second lens unit GR2, and moves together with the second lens unit GR2 during zooming. In common digital cameras, at the position of the aperture stop ST is disposed a mechanical shutter. However, a mechanical shutter requires a space to be secured into which to retract its light-shielding member, and also requires a drive device such as a drive motor. Thus, a mechanical shutter occupies a considerably large space.

In a case, as in the first to fourth embodiments, where the aperture stop ST moves together with a movable lens unit during zooming, mounting a mechanical shutter, which requires a large space, on the movable unit makes the movable unit itself larger. Moreover, this places a heavy burden on the drive unit, and thus may make the entire construction extremely large. That is, even if compact optical components are used, depending on the construction, it is difficult to achieve miniaturization. Accordingly, in the first to fourth embodiments, for miniaturization of the entire construction including mechanical components, it is preferable that a shutter mechanism not be mounted on a movable unit. In this case, as a substitute for a mechanical shutter, the image sensor SR can be provided with an electronic shutter function.

For the grounds given above, it is preferable that the image sensor SR be a solid-state image sensor having an electronic shutter function, and it is further preferable that it be a CCD of the progressive scanning type. However, the shutter function of currently commercially available solid-state image sensors having an electronic shutter function is not as satisfactory as that of a mechanical shutter. Specifically, they tend to produce noise if their wiring conductors are irradiated with light when electric charges are being transferred. Accordingly, it is preferable that a member having a light-shielding function (such as a mechanical shutter or liquid crystal shutter) be disposed in a space where the second and third lens units GR2 and GR3 are fixed, and that photographing be achieved by performing the following three steps in this order:

a first step of driving the electronic shutter in response to a request to photograph from the user;

a second step of driving the member having a light-shielding function to keep the solid-state image sensor from being irradiated with light; and a third step of transferring the electric charges accumulated in the solid-state image sensor to an image processing device.

In all the embodiments, the zoom lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material. As necessary, in addition to the aperture stop ST, a beam restricting plate or the like for cutting unnecessary light may be arranged.

In all the embodiments, focusing at a close distance is achieved by moving out the third lens unit GR3 toward the object side. Conventionally, zooming is achieved by driving a plurality of lens units by the use of the drive power transmitted thereto from a single drive device through a zoom cam, and focusing is achieved by driving a focus lens unit by the use of the drive power of a separate drive device. However, in a construction, as in all the embodiments, where there are two lens units that are moved for zooming or focusing, a drive device can be connected directly to those two lens units without using a cam or the like. It is preferable to achieve zooming and focusing by controlling the distances traveled by the individual lens units, because this eliminates the need for a cam and thus helps simplify the construction, leading to slimming-down. Moreover, it is preferable that, as described earlier, the third lens unit GR3 be composed of at least one negative lens element and at least one positive lens element and that focusing be achieved by moving out the third lens unit GR3 toward the object side, because this helps reduce variations in aberrations that accompany focusing.

EXAMPLES

Hereinafter, practical examples of the zoom lens system used in a taking lens apparatus embodying the present invention will be presented with reference to their construction data and other data. Examples 1 to 5 presented below are numerical examples corresponding to the first to fifth embodiments, respectively, described hereinbefore, and therefore the optical construction diagrams (FIGS. 1 to 10) of the first and fifth embodiments also show the lens construction of Examples 1 to 5, respectively.

Tables 1 to 4, Tables 5 to 8, Tables 9 to 12, Tables 13 to 16, and Tables 17 to 20 show the construction data of Examples 1 to 5, respectively. Table 21 shows the values of the conditional formulae and of the parameters used therein and the data related thereto as actually observed in each example. Tables 1, 5, 9, 13, and 17 show the design wavelength ($\lambda_0$, in nm), the maximum image height (Ymax, in mm), and the focal length (f, in mm) and f-number (Fno) of the entire system as observed at different focal lengths (W, M, and T). Here, W denotes the wide-angle end (the shortest-focal-length state), M denotes the middle (the middle-focal-length state), and T denotes the telephoto end (the longest-focal-length state).

Tables 2, 6, 10, 14, and 18 show, for the respective examples, the basic optical construction (with "i" representing the surface number) from the object surface OB to the image surface IM. In these tables, ri (i=0, 1, 2, 3, ... ) represents the radius of curvature of the i-th surface from the object side, di (i=0, 1, 2, 3, ... ) represents the axial distance between the i-th and (i+1)-th surfaces from the object side (with d0 representing the object distance), and Ni (i=1, 2, 3, ... ) and vi (i=1, 2, 3, ... ) respectively represent the refractive index for the d-line and the Abbe number of the optical material filling the axial distance di.

A surface of which the radius of curvature ri is marked with an asterisk (*) is an aspherical surface (a refractive optical surface having an aspherical shape, a surface exerting an refracting effect equivalent to that of an aspherical surface, or the like), of which the surface shape is defined by formula (AS) below. Tables 3, 7, 11, 15, and 19 show the aspherical surface data of the respective examples (no data is given for Aj=0).

$$x=(C0 \cdot y^2)/\{1+[1-(1+K) \cdot C0^2 \cdot y^2]^{1/2}\}+\Sigma(Aj \cdot y^j) \quad (AS)$$

where
- x represents the displacement along the optical axis AX at the height y (relative to the vertex);
- y represents the height in a direction perpendicular to the optical axis AX;
- C0 represents the paraxial curvature (=1/ri);
- K represents the conic coefficient; and
- Aj represents the aspherical coefficient of the j-th order.

An air gap of which the axial distance di is marked with a number sign (#) has a variable axial distance, i.e., an axial distance that varies as zooming or focusing is performed. Tables 4, 8, 12, 16, and 20 show the variable axial distance data of the respective examples. In these tables, POS1, POS2, and POS3 represents the variable axial distances observed with the focus at infinity, POS4, POS5, and PO6 those observed with the focus at a close distance, POS1 and POS4 those observed at the wide-angle end W, POS2 and POS5 those observed at the middle-focal-length position M, and POS3 and POS6 those observed at telephoto end T.

FIGS. 11A to 11I, FIGS. 13A to 13I, FIGS. 15A to 15I, FIGS. 17A to 17I, and FIGS. 18A to 18I are aberration diagrams of Examples 1 to 5, respectively, as obtained with the focus at infinity, and FIGS. 12A to 12I, FIGS. 14A to 14I, FIGS. 16A to 16I, and FIGS. 19A to 19I are aberration diagrams of Examples 1 to 3 and 5 as obtained with the focus at a close distance. Among these aberration diagrams, those with numbers suffixed with A, B, and C show the aberrations observed at the wide-angle end W, those with numbers suffixed with D, E, and F show the aberrations observed at the middle-focal-length position M, and those with numbers suffixed with G, H, and I show the aberrations observed at the telephoto end T.

Among the aberration diagrams, those with numbers suffixed with A, D, and G show spherical aberration, those with numbers suffixed with B, E, and H show astigmatism, and those with numbers suffixed with C, F, and I show distortion. In the spherical aberration diagrams, the amount of spherical aberration observed for light of the design wavelength $\lambda_0$ and the g- and C-lines is plotted as the deviation from the paraxial image surface along the optical axis AX (along the horizontal axis, in mm), while the vertical axis represents the height of incidence on the pupil as normalized with respect to its maximum height (i.e., the relative pupil height). In the astigmatism diagrams, the broken line DT represents the tangential image surface and the solid line represents the sagittal image surface as plotted as the deviation from the paraxial image surface along the optical axis AX (along the horizontal axis, in mm), while the vertical axis represents the image height (IMG HT, in mm). In the distortion diagrams, the horizontal axis represents the distortion (%) observed for light of the design wavelength $\lambda_0$, while the vertical axis represents the image height (IMG HT, in mm).

Thus, the embodiments and examples described hereinbefore include inventions (A1) to (A15) and (B11) to (B4) having features as noted below, and, with those features, it is possible to realize slim, compact zoom lens systems. By incorporating such a zoom lens system in a taking lens apparatus or camera, it is possible to realize a slim, compact, inexpensive, and high-performance taking lens apparatus or camera.

(A1) A zoom lens system comprising, from the object side, a first lens unit including a reflective member and having a negative optical power, a second lens unit having a positive optical power, and a third lens unit having a positive optical power, wherein, during zooming from the wide-angle end to the telephoto end, the first lens unit remains stationary relative to the image surface, the second lens unit moves toward the object side, and the third lens unit either moves toward the image side or moves along a U-shaped trajectory convex to the image side.

(A2) A zoom lens system as described in (A1) above, wherein the reflective member reflects a light beam in such a way that the optical axis of the zoom lens system is bent at substantially 90°.

(A3) A zoom lens system as described in (A1) or (A2) above, wherein the first lens unit is composed of, from the object side, a first lens element having an aspherical surface and having a negative optical power, the reflective member, and a lens unit composed of at least one negative lens element and at least one positive lens element, wherein the reflective member reflects a light beam in such a way that the optical axis of the zoom lens system is bent at substantially 90°.

(A4) A zoom lens system as described in one of (A1) to (A3) above, wherein the third lens unit is composed of at least one negative lens element and at least one positive lens element.

(A5) A zoom lens system as described in one of (A1) to (A4) above, wherein at least one of conditions (1), (1a), (1b), (2), (2a), and (3) is fulfilled.

(A6) A zoom lens system as described in one of (A1) to (A5) above, wherein on the object side of the reflective member is disposed, as an optical element having an optical power, only one negative lens element having an aspherical surface.

(A7) A zoom lens system as described in (A6) above, wherein the reflective member is a prism cemented to the negative lens element.

(A8) A zoom lens system as described in one of (A1) to (A5) above, wherein the reflective member is a prism having a concave surface on the object side.

(A9) A zoom lens system as described in one of (A1) to (A5) above, wherein on the image side of the reflective member is disposed a positive lens unit composed of at least one negative lens element and at least one positive lens element.

(A10) A zoom lens system as described in (A9) above, wherein the positive lens unit is composed of a cemented lens element formed by cementing together a negative lens element and a positive lens element.

(A11) A zoom lens system as described in one of (A1) to (A10) above, wherein the third lens unit is composed of, from the object side, a negative meniscus lens element convex to the image side and a positive lens element.

(A12) A zoom lens system as described in one of (A1) to (A11) above, further comprising an aperture stop between the first and second lens units.

(A13) A zoom lens system as described in one of (A1) to (A11) above, further comprising an aperture stop between the second and third lens units.

(A14) A zoom lens system as described in (A12) or (A13) above, wherein, during zooming from the wide-angle end to the telephoto end, the aperture stop remains stationary relative to the image surface.

(A15) A zoom lens system as described in (A12) or (A13) above, wherein, during zooming from the wide-angle end to the telephoto end, the aperture stop moves together with the second lens unit.

(B1) A taking lens apparatus comprising a zoom lens system as described in one of (A1) to (A15) above and an image sensor that converts the optical image formed by the zoom lens system into an electrical signal.

(B2) A taking lens apparatus as described in (B1) above, wherein the image sensor is a solid-state image sensor provide with an electronic shutter function.

(B3) A camera comprising a taking lens apparatus as described in (B1) or (B2) above and used to photograph at least a still or moving picture of a subject.

(B4) A camera as described in (B3) above, wherein the camera is a digital camera, video camera, or camera incorporated in or externally fitted to a digital video unit, personal computer, mobile computer, cellular phone, personal digital assistant (PDA), or peripheral device therefor.

As described above, according to the present invention, a zoom lens system composed of, from the object side, a negative, a positive, and a positive zoom unit is so constructed that, during zooming, the first lens unit remains stationary relative to the image surface, the second lens unit moves toward the object side, and the third lens unit either moves toward the image side or moves along a U-shaped trajectory convex to the image side. This makes it possible to realize a slim taking lens apparatus provided with a compact but high-performance zoom lens system that offers high image quality. By applying a taking lens apparatus according to the present invention to a digital camera, video camera, or camera incorporated in or externally fitted to a digital video unit, personal computer, mobile computer, cellular phone, personal digital assistant (PDA), peripheral device therefor (such as a mouse, scanner, printer, or other digital input/output device) or the like, it is possible to make such a device slim, compact, and inexpensive and enhance the optical performance thereof.

By building the first lens unit with, from the object side, a first lens element having an aspherical surface and having a negative optical power, a reflective member that reflects a light beam in such a way that the optical axis of the zoom lens system is bent at substantially 90°, and a lens unit composed of at least one negative lens element and at least one positive lens element, it is possible to satisfactorily correct distortion, astigmatism, and other aberrations in a compact construction. By building the third lens unit with at least one negative lens element and at least one positive lens element, it is possible to satisfactorily correct chromatic and other aberrations. By using as the image sensor a solid-state image sensor having an electronic shutter function, it is possible to make the taking lens apparatus more compact.

TABLE 1

(Example 1)

$\lambda_0$[nm]
587.56

Ymax[mm]
0.71

|  | W | M | T |
|---|---|---|---|
| f[mm] | 1 | 1.75 | 2.86 |
| Fno | 2.6 | 3.8 | 5.1 |

TABLE 2

(Example 1)

| i | ri[mm] | di[mm] | Ni | vi | Unit |
|---|---|---|---|---|---|
| 0 | ∞ | ∞ # |  |  | OB |
| 1 | 47.437 * | 0.237 | 1.77250 | 49.77 | GR1 |
| 2 | 1.450 * | 0.522 |  |  |  |
| 3 | ∞ | 1.494 | 1.84666 | 23.82 | PR |
| 4 | ∞ | 0.368 |  |  |  |
| 5 | −2.299 | 0.190 | 1.75450 | 51.57 |  |
| 6 | 2.255 | 0.524 | 1.83649 | 41.22 |  |
| 7 | −2.783 | 3.183 # |  |  |  |
| 8 | ∞ | 0.024 |  |  | ST |
| 9 | 1.660 * | 0.324 | 1.52200 | 52.20 | GR2 |
| 10 | 28.521 * | 0.480 |  |  |  |
| 11 | 11.947 | 0.190 | 1.84937 | 35.51 |  |
| 12 | 1.301 | 0.497 | 1.48749 | 70.44 |  |
| 13 | −2.450 | 0.639 # |  |  |  |
| 14 | −1.705 | 0.190 | 1.84666 | 23.82 | GR3 |
| 15 | −2.363 | 0.024 |  |  |  |
| 16 | 8.346 * | 0.402 | 1.52200 | 52.20 |  |
| 17 | −2.413 * | 1.837 # |  |  |  |
| 18 | ∞ | 0.356 | 1.51680 | 64.20 | OF |
| 19 | ∞ | 0.119 |  |  |  |
| 20 | ∞ | 0.142 | 1.51680 | 64.20 |  |
| 21 | ∞ | 0.119 |  |  |  |
| 22 | ∞ |  |  |  | IM |

TABLE 3

(Example 1)
|| Aspherical Surface Data of Surface i(*)

| i | K | A4 | A6 | A8 | A10 | A12 |
|---|---|---|---|---|---|---|
| 1 | 0 | 1.018E−01 | −5.144E−02 | 2.054E−02 | −3.549E−03 | 0.000E+00 |
| 2 | 0 | 1.096E−01 | −1.567E−03 | −2.116E−02 | 3.252E−02 | 0.000E+00 |
| 9 | 0 | −2.208E−02 | 2.277E−02 | −5.647E−02 | −3.952E−02 | 0.000E+00 |
| 10 | 0 | −1.588E−03 | 3.355E−02 | −9.916E−02 | −4.677E−03 | 0.000E+00 |
| 16 | 0 | −8.225E−03 | −1.018E−03 | 2.186E−03 | 2.652E−02 | 0.000E+00 |
| 17 | 0 | −2.590E−04 | −5.065E−03 | 7.609E−03 | 2.432E−02 | 0.000E+00 |

TABLE 4

(Example 1)
Variable Distance Data di(#)

| i | POS1 (W) | POS2 (M) | POS3 (T) | POS4 (W) | POS5 (M) | POS6 (T) |
|---|---|---|---|---|---|---|
| 0 | ∞ | ∞ | ∞ | 35.578 | 35.578 | 35.578 |
| 7 | 3.183 | 1.543 | 0.119 | 3.183 | 1.543 | 0.119 |
| 13 | 0.639 | 3.313 | 5.303 | 0.593 | 3.080 | 4.544 |
| 17 | 1.837 | 0.802 | 0.237 | 1.883 | 1.035 | 0.996 |

TABLE 5

(Example 2)

$\lambda_0$[nm]
587.56

Ymax[mm]
0.77

| | W | M | T |
|---|---|---|---|
| f[mm] | 1 | 1.75 | 2.86 |
| Fno | 2.6 | 3.8 | 5.1 |

TABLE 6

(Example 2)

| i | ri[mm] | di[mm] | Ni | νi | Unit |
|---|---|---|---|---|---|
| 0 | ∞ | ∞ # | | | OB |
| 1 | 55.024 * | 0.275 | 1.77250 | 49.77 | GR1 |
| 2 | 1.575 * | 0.649 | | | |
| 3 | ∞ | 1.788 | 1.84666 | 23.82 | PR |
| 4 | ∞ | 0.328 | | | |
| 5 | −2.581 | 0.220 | 1.75450 | 51.57 | |
| 6 | 2.179 | 0.515 | 1.82660 | 41.70 | |
| 7 | −3.195 | 3.543 # | | | |
| 8 | ∞ | 0.028 | | | ST |
| 9 | 1.691 | 0.346 | 1.59823 | 36.07 | GR2 |
| 10 | 8.006 | 0.464 | | | |
| 11 | −6.017 | 0.220 | 1.84666 | 23.82 | |
| 12 | 2.628 | 0.028 | | | |
| 13 | 2.638 * | 0.585 | 1.52200 | 52.20 | |
| 14 | −2.060 * | 0.731 # | | | |
| 15 | −2.445 | 0.220 | 1.84666 | 23.82 | GR3 |
| 16 | −3.708 | 0.028 | | | |
| 17 | 5.452 * | 0.435 | 1.52200 | 52.20 | |
| 18 | −3.339 * | 1.912 # | | | |
| 19 | ∞ | 0.413 | 1.51680 | 64.20 | OF |
| 20 | ∞ | 0.138 | | | |
| 21 | ∞ | 0.165 | 1.51680 | 64.20 | |
| 22 | ∞ | 0.138 | | | |
| 23 | ∞ | | | | IM |

TABLE 7

(Example 2)
Aspherical Surface Data of Surface i(*)

| i | K | A4 | A6 | A8 | A10 | A12 |
|---|---|---|---|---|---|---|
| 1 | 0 | 1.093E−01 | −5.021E−02 | 1.349E−02 | −1.618E−03 | 0.000E+00 |
| 2 | 0 | 1.206E−01 | −1.066E−03 | −1.712E−02 | 5.968E−03 | 0.000E+00 |
| 13 | 0 | −5.518E−02 | −2.038E−03 | −6.326E−03 | 0.000E+00 | 0.000E+00 |
| 14 | 0 | 1.009E−03 | 3.363E−03 | −9.061E−03 | 0.000E+00 | 0.000E+00 |
| 17 | 0 | −1.929E−02 | 2.799E−02 | −4.509E−02 | 0.000E+00 | 0.000E+00 |
| 18 | 0 | −1.612E−02 | 2.600E−02 | −3.984E−02 | 0.000E+00 | 0.000E+00 |

TABLE 8

(Example 2)
Variable Distance Data di(#)

| i | POS1 (W) | POS2 (M) | POS3 (T) | POS4 (W) | POS5 (M) | POS6 (T) |
|---|---|---|---|---|---|---|
| 0 | ∞ | ∞ | ∞ | 41.268 | 41.268 | 41.268 |
| 7 | 3.543 | 1.755 | 0.138 | 3.543 | 1.755 | 0.138 |
| 14 | 0.731 | 3.679 | 5.774 | 0.688 | 3.467 | 5.126 |
| 18 | 1.912 | 0.753 | 0.275 | 1.955 | 0.965 | 0.923 |

TABLE 9

(Example 3)

$\lambda_0$[nm]
587.56

Ymax[mm]
0.57

| | W | M | T |
|---|---|---|---|
| f[mm] | 1 | 1.75 | 2.86 |
| Fno | 2.45 | 3.62 | 4.86 |

TABLE 10

(Example 3)

| i | ri[mm] | di[mm] | Ni | νi | Unit |
|---|---|---|---|---|---|
| 0 | ∞ | ∞ # | | | OB |
| 1 | −12.258 * | 0.205 | 1.77250 | 49.77 | GR1 |
| 2 | 2.251 * | 0.346 | | | |
| 3 | ∞ | 1.330 | 1.84666 | 23.82 | PR |
| 4 | ∞ | 0.216 | | | |
| 5 | −1.601 | 0.377 | 1.85000 | 40.04 | |
| 6 | 225.358 | 0.087 | | | |
| 7 | 11.123 | 0.296 | 1.62004 | 39.29 | |
| 8 | −1.694 | 2.818 # | | | |
| 9 | ∞ | 0.282 | | | ST |
| 10 | 1.211 | 0.797 | 1.71700 | 47.86 | GR2 |
| 11 | −5.506 | 0.020 | | | |
| 12 | −19.160 * | 0.164 | 1.84666 | 23.82 | |
| 13 | 1.723 * | 0.461 # | | | |
| 14 | −1.526 | 0.164 | 1.84666 | 23.82 | GR3 |
| 15 | −2.471 | 0.020 | | | |
| 16 | 4.471 * | 0.327 | 1.52200 | 52.20 | |
| 17 | −1.859 * | 1.455 # | | | |
| 18 | ∞ | 0.307 | 1.51680 | 64.20 | OF |
| 19 | ∞ | 0.102 | | | |
| 20 | ∞ | 0.123 | 1.51680 | 64.20 | |
| 21 | ∞ | 0.102 | | | |
| 22 | ∞ | | | | IM |

TABLE 11

(Example 3)
Aspherical Surface Data of Surface i(*)

| i | K | A4 | A6 | A8 | A10 | A12 |
|---|---|---|---|---|---|---|
| 1 | 0 | 3.983E−01 | −4.046E−01 | 2.663E−01 | −6.991E−02 | 0.000E+00 |
| 2 | 0 | 4.586E−01 | −1.878E−01 | −1.218E−01 | 3.315E−01 | 0.000E+00 |
| 12 | 0 | 9.413E−02 | −2.306E−01 | 1.616E−01 | −7.092E−02 | 0.000E+00 |
| 13 | 0 | 2.761E−01 | −5.356E−03 | −4.808E−03 | 5.954E−01 | 0.000E+00 |
| 16 | 0 | −1.678E−02 | 2.537E−02 | −1.248E−01 | 5.898E−02 | 0.000E+00 |
| 17 | 0 | 9.025E−03 | 1.056E−02 | −7.479E−02 | 1.432E−02 | 0.000E+00 |

TABLE 12

(Example 3)
Variable Distance Data di(#)

| i | POS1 (W) | POS2 (M) | POS3 (T) | POS4 (W) | POS5 (M) | POS6 (T) |
|---|---|---|---|---|---|---|
| 0 | ∞ | ∞ | ∞ | 30.697 | 30.697 | 30.697 |
| 8 | 2.818 | 1.432 | 0.102 | 2.818 | 1.432 | 0.102 |
| 13 | 0.461 | 2.642 | 4.224 | 0.409 | 2.404 | 3.609 |
| 17 | 1.455 | 0.660 | 0.407 | 1.507 | 0.898 | 1.022 |

TABLE 13

(Example 4)

$\lambda_0$[nm]
546.07
Ymax[mm]
0.57

| | W | M | T |
|---|---|---|---|
| f[mm] | 1 | 1.75 | 2.86 |
| Fno | 3 | 3.4 | 4.5 |

TABLE 14

(Example 4)

| i | ri[mm] | di[mm] | Ni | vi | Unit |
|---|---|---|---|---|---|
| 0 | ∞ | ∞ | | | OB |
| 1 | −1.916 * | 0.066 | 1.84666 | 23.82 | GR1 |
| 2 | ∞ | 0.000 | | | |
| 3 | ∞ | 1.531 | 1.84666 | 23.82 | PR |
| 4 | ∞ | 0.306 | | | |
| 5 | −2.041 * | 0.163 | 1.50371 | 68.17 | |
| 6 | 5.390 * | 0.061 | | | |
| 7 | 4.239 | 0.545 | 1.84666 | 23.82 | |
| 8 | −5.046 | 2.900 # | | | |
| 9 | ∞ | 0.790 | | | ST |
| 10 | 1.271 | 0.668 | 1.61648 | 57.91 | GR2 |
| 11 | −3.813 | 0.143 | 1.84875 | 31.94 | |
| 12 | 6.235 | 0.253 | | | |
| 13 | 2.775 | 0.323 | 1.80178 | 24.70 | |
| 14 | 1.132 | 0.020 | | | |
| 15 | 0.864 * | 0.255 | 1.52200 | 52.20 | |
| 16 | 1.896 * | 0.139 # | | | |
| 17 | 2.494 * | 0.239 | 1.48749 | 70.44 | GR3 |
| 18 | −14.942 | 1.189 # | | | |
| 19 | ∞ | 0.297 | 1.51680 | 64.20 | OF |
| 20 | ∞ | 0.097 | | | |
| 21 | ∞ | 0.116 | 1.51680 | 64.20 | |
| 22 | ∞ | 0.102 | | | |
| 23 | ∞ | | | | IM |

TABLE 15

(Example 4)
Aspherical Surface Data of Surface i(*)

| i | K | A4 | A6 | A8 | A10 | A12 |
|---|---|---|---|---|---|---|
| 1 | 0 | 1.426E−01 | −4.604E−02 | 1.691E−02 | −1.350E−03 | 0.000E+00 |
| 5 | 0 | −6.456E−01 | 1.058E+00 | −1.061E+00 | 2.821E−01 | 0.000E+00 |
| 6 | 0 | −4.417E−01 | 1.085E+00 | −1.249E+00 | 5.565E−01 | 0.000E+00 |
| 15 | 0 | −3.747E−02 | −5.156E−01 | 1.247E+00 | −4.456E+00 | −9.748E−01 |
| 16 | 0 | 3.080E−01 | −6.655E−01 | 4.476E+00 | −1.630E+01 | 1.438E+01 |
| 17 | 0 | −1.160E−02 | 1.484E−01 | −5.328E−01 | 8.979E−01 | −5.624E−01 |

TABLE 16

(Example 4)
Variable Distance Data di(#)

| i | POS1(W) | POS2(M) | POS3(T) |
|---|---|---|---|
| 8 | 2.900 | 1.365 | 0.020 |
| 16 | 0.139 | 2.358 | 4.003 |
| 18 | 1.189 | 0.504 | 0.204 |

TABLE 17

(Example 5)

$\lambda_0$[nm]
587.56
Ymax[mm]
0.76

| | W | M | T |
|---|---|---|---|
| f[mm] | 1 | 1.4 | 2 |
| Fno | 3.58 | 3.8 | 4 |

TABLE 18

(Example 5)

| i | ri[mm] | di[mm] | Ni | vi | Unit |
|---|---|---|---|---|---|
| 0 | ∞ | ∞ # | | | OB |
| 1 | 54.061 * | 0.270 | 1.77250 | 49.77 | GR1 |
| 2 | 1.540 * | 0.589 | | | |
| 3 | ∞ | 1.703 | 1.84666 | 23.82 | PR |
| 4 | ∞ | 0.457 | | | |
| 5 | −1.641 | 0.216 | 1.82308 | 42.50 | |
| 6 | 4.068 | 0.811 | 1.84935 | 35.36 | |
| 7 | −2.269 | 2.159 # | | | |
| 8 | 2.610 * | 0.368 | 1.81356 | 43.48 | GR2 |
| 9 | 6.819 | 0.902 | | | |
| 10 | 5.681 | 0.216 | 1.84686 | 24.41 | |
| 11 | 1.742 | 0.532 | 1.55709 | 62.38 | |
| 12 | −4.691 | 0.027 # | | | |
| 13 | ∞ | 1.975 # | | | ST |
| 14 | −1.769 | 0.216 | 1.84769 | 27.24 | GR3 |
| 15 | −3.110 | 0.027 | | | |
| 16 | 2.480 * | 0.697 | 1.52200 | 52.20 | |
| 17 | −2.261 * | 0.886 # | | | |
| 18 | ∞ | 0.405 | 1.51680 | 64.20 | OF |
| 19 | ∞ | 0.135 | | | |
| 20 | ∞ | 0.162 | 1.51680 | 64.20 | |
| 21 | ∞ | 0.135 | | | |
| 22 | ∞ | | | | IM |

TABLE 19

(Example 5)
Aspherical Surface Data of Surface i(*)

| i | K | A4 | A6 | A8 | A10 | A12 |
|---|---|---|---|---|---|---|
| 1 | 0 | 8.115E−02 | −4.106E−02 | 1.247E−02 | −1.505E−03 | 0.000E+00 |
| 2 | 0 | 6.668E−02 | −5.666E−03 | −2.568E−02 | 1.593E−02 | 0.000E+00 |
| 8 | 0 | −6.028E−03 | 1.438E−04 | −4.502E−04 | 1.368E−04 | 0.000E+00 |
| 16 | 0 | 1.404E−02 | 1.564E−03 | −1.437E−02 | 1.242E−02 | 0.000E+00 |
| 17 | 0 | 6.886E−02 | 7.269E−03 | −3.853E−02 | 2.525E−02 | 0.000E+00 |

TABLE 20

(Example 5)
Variable Distance Data di(#)

| i | POS1 (W) | POS2 (M) | POS3 (T) | POS4 (W) | POS5 (M) | POS6 (T) |
|---|---|---|---|---|---|---|
| 0 | ∞ | ∞ | ∞ | 40.546 | 40.546 | 40.546 |
| 7 | 2.159 | 1.226 | 0.162 | 2.159 | 1.226 | 0.162 |
| 12 | 0.027 | 0.960 | 2.024 | 0.027 | 0.960 | 2.024 |
| 13 | 1.975 | 2.360 | 2.631 | 1.932 | 2.257 | 2.390 |
| 17 | 0.886 | 0.501 | 0.230 | 0.929 | 0.605 | 0.471 |

TABLE 21

(Actual Values of Conditional Formulae & Related Data)

| Condition | | Ex. 1 | Ex. 2 | Ex. 3 | Ex. 4 | Ex. 5 |
|---|---|---|---|---|---|---|
| (1) | Dref | 2.384 | 2.765 | 1.893 | 1.837 | 2.748 |
| (1a) | Ymax | 0.712 | 0.770 | 0.573 | 0.571 | 0.757 |
| (1b) | Dref/Ymax | 3.348 | 3.591 | 3.304 | 3.217 | 3.630 |
| (2) | fw | 1.000 | 1.000 | 1.000 | 1.000 | 1.000 |
| (2a) | ft | 2.860 | 2.860 | 2.860 | 2.860 | 2.000 |
| | m2w | −0.571 | −0.567 | −0.570 | −0.548 | −0.665 |
| | m2t | −1.137 | −1.168 | −1.180 | −1.129 | −1.037 |
| | (ft · m2w)/(fw · m2t) | 1.436 | 1.388 | 1.382 | 1.388 | 1.283 |
| (3) | Xa | 0.131 | 0.200 | 0.175 | 0.141 | 0.137 |
| | Xb | 0.086 | 0.133 | 0.147 | 0.000 | 0.063 |
| | Xa − Xb | 0.045 | 0.067 | 0.028 | 0.141 | 0.074 |

What is claimed is:

1. A taking lens apparatus comprising:

a zoom lens system that is composed of a plurality of lens units and that achieves zooming by varying distances between the lens units; and an image sensor that converts an optical image formed by the zoom lens system into an electrical signal;

wherein the zoom lens system comprises:

a first lens unit that is disposed at an object-side end of the zoom lens system, that has a negative optical power as a whole, and that remains stationary relative to the image sensor during zooming of the zoom lens system, the first lens unit including a cemented lens element, the cemented lens element including a negative lens element and a positive lens element;

a second lens unit that is disposed on an image-sensor side of the first lens unit with a variable aerial distance secured in between, that has a positive optical power as a whole, and that moves toward an object side during zooming of the zoom lens system from a wide-angle end to a telephoto end; and a third lens unit that is disposed on an image-sensor side of the second lens unit with a variable aerial distance secured in between, that has a positive optical power as a whole, and that moves toward an image side during initial zooming from the wide-angle end to the telephoto end.

2. A taking lens apparatus as claimed in claim 1, wherein the third lens unit moves toward an image side during zooming of the zoom lens system from the wide-angle end to the telephoto end.

3. A taking lens apparatus as claimed in claim 1, wherein the third lens unit moves along a U-shaped trajectory convex to an image side during zooming of the zoom lens system from the wide-angle end to the telephoto end.

4. A taking lens apparatus as claimed in claim 1, wherein the first lens unit includes an aspherical surface.

5. A taking lens apparatus as claimed in claim 1, wherein an aperture stop is disposed between the first and second lens units.

6. A taking lens apparatus as claimed in claim 1, wherein an aperture stop is disposed between the second and third lens units.

7. A taking lens apparatus as claimed in claim 1, wherein the zoom lens system includes an aperture stop that moves together with the second lens unit during zooming.

8. A taking lens apparatus as claimed in claim 1, wherein the zoom lens system includes an aperture stop that remains stationary relative to an image plane during zooming.

9. A taking lens apparatus as claimed in claim 1, wherein the third lens unit is composed of a plurality of lens elements.

10. A taking lens apparatus as claimed in claim 1, wherein the following condition is fulfilled:

$$2.5 < Dref/Ymax < 4$$

where

Dref represents an axial distance between a most object-side optical component of the first lens unit and a next most object-side optical component of the first lens unit; and Ymax represents a maximum image height.

11. A taking lens apparatus as claimed in claim 1, wherein the following condition is fulfilled:

$$1.0 < (ft \cdot m2w)/(fw \cdot m2t)$$

where fw represents a focal length of the zoom lens system as a whole at the wide-angle end;

ft represents a focal length of the zoom lens system as a whole at the telephoto end;

m2w represents an imaging magnification of the second lens unit at the wide-angle end; and m2t represents an imaging magnification of the second lens unit at the telephoto end.

12. A taking lens apparatus as claimed in claim 1, wherein focusing is achieved by moving the third lens unit.

13. A taking lens apparatus as claimed in claim 1, wherein the most object-side optical component of the first lens unit is comprised of one lens element.

14. A taking lens apparatus comprising:

a zoom lens system that is composed of a plurality of lens units and that achieves zooming by varying distances between the lens units; and an image sensor that converts an optical image formed by the zoom lens system into an electrical signal;

wherein the zoom lens system comprises:

a first lens unit that is disposed at an object-side end of the zoom lens system, that has a negative optical power as a whole, that includes a reflective member for bending an optical axis of the zoom lens system as a whole at substantially 90°, and that remains stationary relative to the image sensor during zooming of the zoom lens system;

a second lens unit that is disposed on an image-sensor side of the first lens unit with a variable aerial distance secured in between, that has a positive optical power as a whole, and that moves toward an object side during zooming of the zoom lens system from a wide-angle end to a telephoto end; and a third lens unit that is disposed on an image-sensor side of the second lens unit with a variable aerial distance secured in between, that has a positive optical power as a whole, and that moves toward an image side during initial zooming from the wide-angle end to the telephoto end, the third lens unit including a plurality of lens elements.

15. A taking lens apparatus as claimed in claim 14, wherein the third lens unit moves toward an image side during zooming of the zoom lens system from the wide-angle end to the telephoto end.

16. A taking lens apparatus as claimed in claim 14, wherein the third lens unit moves along a U-shaped trajectory convex to an image side during zooming of the zoom lens system from the wide-angle end to the telephoto end.

17. A taking lens apparatus as claimed in claim 14, wherein the first lens unit includes an aspherical surface.

18. A taking lens apparatus as claimed in claim 14, wherein an aperture stop is disposed between the first and second lens units.

19. A taking lens apparatus as claimed in claim 14, wherein an aperture stop is disposed between the second and third lens units.

20. A taking lens apparatus as claimed in claim 14, wherein the zoom lens system includes an aperture stop that moves together with the second lens unit during zooming.

21. A taking lens apparatus as claimed in claim 14, wherein the zoom lens system includes an aperture stop that remains stationary relative to an image plane during zooming.

22. A taking lens apparatus as claimed in claim 14, wherein the following condition is fulfilled:

$$2.5 < Dref/Ymax < 4$$

where

Dref represents a sum of axial distances between an object-side optical component located immediately in front of the reflective member and an image-side optical component located immediately behind the reflective member; and Ymax represents a maximum image height.

23. A taking lens apparatus as claimed in claim 14, wherein the following condition is fulfilled:

$$1.0 < (ft \cdot m2w)/(fw \cdot m2t)$$

where fw represents a focal length of the zoom lens system as a whole at the wide-angle end;

ft represents a focal length of the zoom lens system as a whole at the telephoto end;

m2w represents an imaging magnification with the second lens unit at the wide-angle end; and m2t represents an imaging magnification with the second lens unit at the telephoto end.

24. A taking lens apparatus as claimed in claim 14, wherein focusing is achieved by moving the third lens unit.

25. A taking lens apparatus as claimed in claim 14, wherein only one lens element is disposed on an object side of the reflective member.

26. A camera comprising:
a taking lens apparatus including a zoom lens system that is composed of a plurality of lens units and that achieves zooming by varying distances between the lens units and an image sensor that converts an optical image formed by the zoom lens system into an electrical signal;
wherein the zoom lens system comprises:
a first lens unit that is disposed at an object-side end of the zoom lens system, that has a negative optical power as a whole, and that remains stationary relative to the image sensor during zooming of the zoom lens system, the first lens unit including a cemented lens element, the cemented lens element including a negative lens element and a positive lens element;
a second lens unit that is disposed on an image-sensor side of the first lens unit with a variable aerial distance secured in between, that has a positive optical power as a whole, and that moves toward an object side during zooming of the zoom lens system from a wide-angle end to a telephoto end; and
a third lens unit that is disposed on an image-sensor side of the second lens unit with a variable aerial distance secured in between, that has a positive optical power as a whole, and that moves toward an image side during initial zooming from the wide-angle end to the telephoto end.

27. A camera as claimed in claim 26, wherein the third lens unit moves toward an image side during zooming of the zoom lens system from the wide-angle end to the telephoto end.

28. A camera as claimed in claim 26, wherein the third lens unit moves along a U-shaped trajectory convex to an image side during zooming of the zoom lens system from the wide-angle end to the telephoto end.

29. A camera as claimed in claim 26, wherein the first lens unit includes an aspherical surface.

30. A camera as claimed in claim 26, wherein an aperture stop is disposed between the first and second lens units.

31. A camera as claimed in claim 26, wherein an aperture stop is disposed between the second and third lens units.

32. A camera as claimed in claim 26, wherein the zoom lens system includes an aperture stop that moves together with the second lens unit during zooming.

33. A camera as claimed in claim 26, wherein the zoom lens system includes an aperture stop that remains stationary relative to an image plane during zooming.

34. A camera as claimed in claim 26, wherein the third lens unit is composed of a plurality of lens elements.

35. A camera as claimed in claim 26, wherein the following condition is fulfilled:

$$2.5 < Dref/Ymax < 4$$

where
Dref represents an axial distance between a most object-side optical component of the first lens unit and a next most object-side optical component of the first lens unit; and
Ymax represents a maximum image height.

36. A camera as claimed in claim 26, wherein the following condition is fulfilled:

$$1.0 < (ft \cdot m2w)/(fw \cdot m2t)$$

where
fw represents a focal length of the zoom lens system as a whole at the wide-angle end;
ft represents a focal length of the zoom lens system as a whole at the telephoto end;
m2w represents an imaging magnification of the second lens unit at the wide-angle end; and
m2t represents an imaging magnification of the second lens unit at the telephoto end.

37. A camera as claimed in claim 26, wherein focusing is achieved by moving the third lens unit.

38. A camera as claimed in claim 26, wherein the most object-side optical component of the first lens unit is comprised of one lens element.

39. A camera comprising:
a taking lens apparatus including a zoom lens system that is composed of a plurality of lens units and that achieves zooming by varying distances between the lens units and an image sensor that converts an optical image formed by the zoom lens system into an electrical signal;
wherein the zoom lens system comprises:
a first lens unit that is disposed at an object-side end of the zoom lens system, that has a negative optical power as a whole, that includes a reflective member for bending an optical axis of the zoom lens system as a whole at substantially 90°, and that remains stationary relative to the image sensor during zooming of the zoom lens system;
a second lens unit that is disposed on an image-sensor side of the first lens unit with a variable aerial distance secured in between, that has a positive optical power as a whole, and that moves toward an object side during zooming of the zoom lens system from a wide-angle end to a telephoto end; and
a third lens unit that is disposed on an image-sensor side of the second lens unit with a variable aerial distance secured in between, that has a positive optical power as a whole, and that moves toward an image side during initial zooming from the wide-angle end to the telephoto end, the third lens unit including a plurality of lens elements.

40. A camera as claimed in claim 39, wherein the third lens unit moves toward an image side during zooming of the zoom lens system from the wide-angle end to the telephoto end.

41. A camera as claimed in claim 39, wherein the third lens unit moves along a U-shaped trajectory convex to an image side during zooming of the zoom lens system from the wide-angle end to the telephoto end.

42. A camera as claimed in claim 39, wherein the first lens unit includes an aspherical surface.

43. A camera as claimed in claim 39, wherein an aperture stop is disposed between the first and second lens units.

44. A camera as claimed in claim 39, wherein an aperture stop is disposed between the second and third lens units.

45. A camera as claimed in claim 39, wherein the zoom lens system includes an aperture stop that moves together with the second lens unit during zooming.

46. A camera as claimed in claim 39, wherein the zoom lens system includes an aperture stop that remains stationary relative to an image plane during zooming.

47. A camera as claimed in claim 39, wherein the following condition is fulfilled:

$$2.5 < Dref/Ymax < 4$$

where

Dref represents a sum of axial distances between an object-side optical component located immediately in front of the reflective member and an image-side optical component located immediately behind the reflective member; and Ymax represents a maximum image height.

48. A camera as claimed in claim 39, wherein the following condition is fulfilled:

$$1.0 < (ft \cdot m2w)/(fw \cdot m2t)$$

where fw represents a focal length of the zoom lens system as a whole at the wide-angle end;

ft represents a focal length of the zoom lens system as a whole at the telephoto end;

m2w represents an imaging magnification with the second lens unit at the wide-angle end; and m2t represents an imaging magnification with the second lens unit at the telephoto end.

49. A camera as claimed in claim 39, wherein focusing is achieved by moving the third lens unit.

50. A camera as claimed in claim 39, wherein only one lens element is disposed on an object side of the reflective member.

\* \* \* \* \*